United States Patent
Von Ryberg et al.

(10) Patent No.: US 11,466,510 B2
(45) Date of Patent: Oct. 11, 2022

(54) SEAL WITH RAT RESISTANT BARRIER

(71) Applicant: RODEXIT APS, Holte (DK)

(72) Inventors: Bjørn Von Ryberg, Holte (DK); Claus Frimand, Holte (DK)

(73) Assignee: Rodexit APS, Holte (DK)

( * ) Notice: Subject to any disclaimer, the term of this patent is extended or adjusted under 35 U.S.C. 154(b) by 196 days.

(21) Appl. No.: 16/464,978

(22) PCT Filed: Nov. 29, 2017

(86) PCT No.: PCT/DK2017/050401
§ 371 (c)(1),
(2) Date: May 29, 2019

(87) PCT Pub. No.: WO2018/099533
PCT Pub. Date: Jun. 7, 2018

(65) Prior Publication Data
US 2019/0316410 A1   Oct. 17, 2019

(30) Foreign Application Priority Data

| Nov. 30, 2016 | (DK) | PA201670947 |
| May 3, 2017 | (DK) | PA201770302 |
| Jun. 15, 2017 | (DK) | PA201770464 |
| Sep. 29, 2017 | (DK) | PA201700540 |
| Oct. 18, 2017 | (DK) | PA201770793 |

(51) Int. Cl.
*E06B 7/23* (2006.01)

(52) U.S. Cl.
CPC .......... *E06B 7/2316* (2013.01); *E06B 7/2305* (2013.01); *E06B 7/2314* (2013.01)

(58) Field of Classification Search
CPC ...... E06B 7/2314; E06B 7/2316; A01M 29/30
See application file for complete search history.

(56) References Cited

U.S. PATENT DOCUMENTS

| 1,352,813 A | 9/1920 | Kennicott et al. | |
| 2,105,164 A * | 1/1938 | Schlegel | E06B 7/22 49/493.1 |

(Continued)

FOREIGN PATENT DOCUMENTS

| DE | 2038302 A1 | 2/1972 |
| DE | 3236883 A1 * | 4/1983 |

(Continued)

OTHER PUBLICATIONS

International Search Report, Application No. PCT/DK2017/050401, dated Feb. 7, 2018, 3 pages.

(Continued)

*Primary Examiner* — Catherine A Kelly
(74) *Attorney, Agent, or Firm* — Dinsmore & Shohl LLP

(57) ABSTRACT

A flexible and oblong blade seal for sealing a gap between a door leaf and an adjacent surface includes A) a flexible outer material and B) a section with the sealing function (the sealing section), in which a barrier of a plurality of substantially parallel metal wires and/or narrow metal strips is embedded in the flexible outer material in such a way, that the wires and/or strips are arranged in parallel to the longitudinal direction of the seal. A method for mounting such seals and a method for producing them.

20 Claims, 13 Drawing Sheets

(56) References Cited

U.S. PATENT DOCUMENTS

| | | | |
|---|---|---|---|
| 2,176,964 A | 10/1939 | Harrah | |
| 2,337,303 A * | 12/1943 | Spraragen | E06B 7/22 |
| | | | 49/475.1 |
| 2,949,651 A | 8/1960 | Hill | |
| 3,324,598 A | 6/1967 | Lionel et al. | |
| 3,427,776 A | 2/1969 | Lake et al. | |
| 3,436,891 A | 4/1969 | Church | |
| 3,527,013 A | 9/1970 | Kruschwitz | |
| 3,708,871 A | 1/1973 | Mintz | |
| 3,788,008 A | 1/1974 | Yackiw et al. | |
| 4,172,106 A | 10/1979 | Lewis | |
| 4,192,101 A * | 3/1980 | White | E06B 7/16 |
| | | | 49/470 |
| 4,228,209 A | 10/1980 | Chavannes | |
| 4,444,709 A * | 4/1984 | Hayashi | B32B 15/08 |
| | | | 264/173.1 |
| 4,455,334 A * | 6/1984 | Ogino | B32B 15/02 |
| | | | 428/34.1 |
| 4,520,562 A | 6/1985 | Sado et al. | |
| 4,624,093 A | 11/1986 | Gibson | |
| 4,783,579 A | 11/1988 | Brandolf et al. | |
| 4,788,088 A | 11/1988 | Kohl | |
| 4,830,898 A | 5/1989 | Smith | |
| 4,902,480 A | 2/1990 | Keys | |
| 5,092,079 A * | 3/1992 | Brookman | E06B 7/2316 |
| | | | 160/40 |
| 5,174,065 A * | 12/1992 | Schlicht | E06B 7/2312 |
| | | | 49/470 |
| 5,465,532 A * | 11/1995 | Varin | E06B 7/2316 |
| | | | 49/470 |
| 5,500,280 A * | 3/1996 | Yamazaki | H01R 13/2414 |
| | | | 428/221 |
| 5,669,187 A * | 9/1997 | Bushong | E04B 1/72 |
| | | | 52/799.12 |
| 5,840,401 A | 11/1998 | Baesecke | |
| 5,916,660 A * | 6/1999 | Currie | B60R 13/06 |
| | | | 428/122 |
| 6,276,096 B1 * | 8/2001 | Fair | B60P 3/36 |
| | | | 52/293.3 |
| 6,378,250 B1 * | 4/2002 | Yen | E06B 7/2316 |
| | | | 49/310 |
| 6,455,138 B1 * | 9/2002 | Murano | B32B 27/40 |
| | | | 428/209 |
| 6,715,231 B2 | 4/2004 | Renzi | |
| 6,761,954 B2 | 7/2004 | Hauser | |
| 6,772,560 B2 | 8/2004 | Dischiant et al. | |
| 6,837,000 B2 * | 1/2005 | Renzi | E06B 7/28 |
| | | | 160/40 |
| 8,726,575 B1 * | 5/2014 | Vulpitta | E06B 7/2314 |
| | | | 49/470 |
| 9,867,367 B2 | 1/2018 | Schild, III et al. | |
| 10,513,845 B1 * | 12/2019 | Scott | E06B 3/485 |
| 10,821,778 B2 * | 11/2020 | Harada | B60C 9/0007 |
| 11,293,217 B2 * | 4/2022 | Frimand | B60J 10/18 |
| 2003/0074843 A1 | 4/2003 | Dischinat et al. | |
| 2005/0086868 A1 | 4/2005 | Santelli | |
| 2005/0147702 A1 | 7/2005 | Higashi | |
| 2008/0148640 A1 | 6/2008 | Marron | |
| 2015/0292197 A1 * | 10/2015 | Miller | E06B 7/232 |
| | | | 49/489.1 |
| 2016/0029616 A1 | 2/2016 | Johnston | |
| 2019/0316410 A1 | 10/2019 | Von Ryberg et al. | |
| 2021/0040790 A1 * | 2/2021 | Von Ryberg | A01M 29/30 |
| 2022/0010614 A1 * | 1/2022 | Von Ryberg | E06B 7/2314 |

FOREIGN PATENT DOCUMENTS

| | | | | |
|---|---|---|---|---|
| DE | 202010009552 U1 | | 9/2010 | |
| DE | 202016107091 U1 * | | 3/2017 | E06B 7/231 |
| EP | 0178064 A2 | | 4/1986 | |
| EP | 1935281 A1 | | 6/2008 | |
| GB | 361327 A | | 11/1931 | |
| GB | 445049 A | | 4/1936 | |
| GB | 548757 A | * | 10/1942 | |
| GB | 2127884 A | | 4/1984 | |
| GB | 2232434 A | * | 12/1990 | E06B 7/2316 |
| GB | 2451881 A | | 2/2009 | |
| GB | 2462998 A | | 3/2010 | |
| GB | 2541244 A | | 2/2017 | |
| GB | 2592187 A | * | 8/2021 | B32B 15/02 |
| WO | WO-2015001096 A1 * | | 1/2015 | E04B 1/68 |
| WO | 2018099532 A1 | | 6/2018 | |
| WO | 2018099533 A1 | | 6/2018 | |

OTHER PUBLICATIONS

Written Opinion of the International Preliminary Examing Authority, Application No. PCT/DK2017/050401, dated Jan. 17, 2019, 5 pages.

Robert M. Corrigan, "Rodent Control: A Practical Guide for Pest Management Professionals" Published by GIE Media, Copyright 2001, Library of Congress Catalog No. 2001 135174, ISBN: I-883751-16-0, 5 pages.

Bobby Corrigan, "[Annual Rodent Control Issue] Of Rodents and Doors" Aug. 30, 2015, Retrieved at https://www.pctonline.com/article/pct0815-rodent-control-doors-holes/, 4 pages.

Publication Document and International Search Report, Applicaiton No. PCT/DK2017/050401, dated Feb. 7, 2018, 53 pages.

Written Opinion of the International Preliminary Examing Authority, Application No. PCT/DK2017/050401, dated Jan. 17, 2019, 10 pages.

International Search Report, Application No. PCT/DK2018/050412, dated Mar. 25, 2019, 6 pages.

* cited by examiner

301a

301b

301c

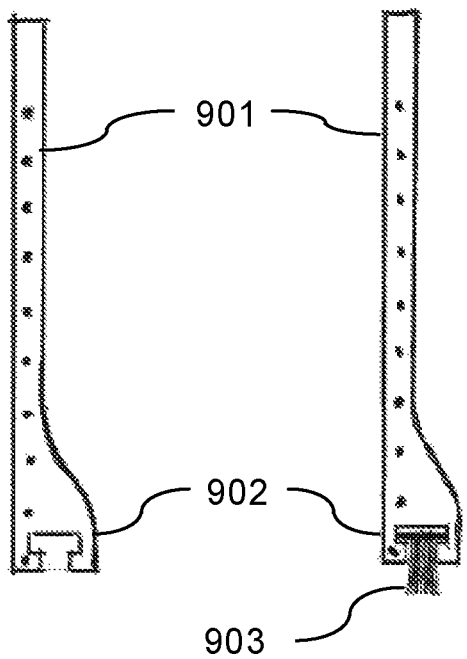
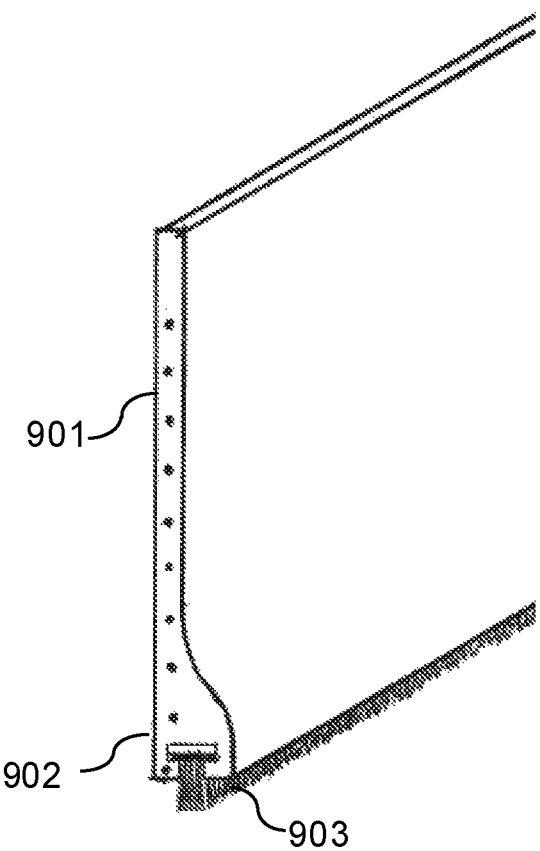
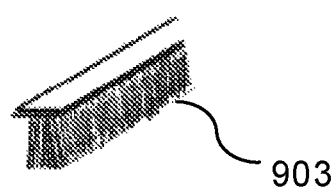
Fig. 9a  Fig. 9b
Fig. 9d
Fig. 9c

SEAL WITH RAT RESISTANT BARRIER

TECHNICAL FIELD

The disclosure relates to oblong blade seals and seal assemblies for sealing a space A) between a building part—e.g. an edge of a door leaf—and an adjacent surface B) between a wall and an adjacent surface and/or C) between a fence and an adjacent surface to avoid entrance of for example unwanted animals, insects, or water—especially unwanted rodents such as rats and mice. The unwanted water may include sewage water, rain water and water from flooding. The seals and seal assemblies may also help in controlling the physical atmosphere within a room behind the door by restricting air drafts so that the interior may be more effectively heated or cooled.

BACKGROUND

A general problem of entryway design for buildings relates to the dual issues of excluding inclement weather and animals or vermin from entering or impacting the interior when the entryway is shut. One category of known sealing strips for excluding inclement weather is flexible synthetic or rubber strips, which are installed at the perimeter of the door at an entryway. Another category of seals is high density brush door seals with rows of tightly packed bristles. However, none of the known door seals can effectively keep rats and mice out. Therefore, there is a need for better door seals in order to secure buildings against rats and mice. The seal according to the invention meets this need. Compared with existing seals it furthermore presents a considerable number of other substantial advantages. Below these advantages are explained in further detail.

DISCLOSURE

The seal according to the aspects of the disclosed embodiments is an oblong blade seal of a flexible outer material with a rat and/or mice resistant barrier made of a plurality of elongated metal members in the form of A) metal wires, B) narrow metal strips or C) a combination of metal wires and narrow metal strips embedded in the part of the seal with the sealing function (the sealing section), where the elongated metal members are arranged at a distance to each other and substantially in parallel to the longitudinal direction of the seal.

Terminology

The expressions "door leaf", "door wind", "door panel" and (when used about a double door) "door half" are used interchangeably and mean one and the same thing, namely the board shaped part of the door, which moves when opening and closing the door.

The expression "the threshold dap" means the gap between the bottom edge of a door leaf in closed position and the underlying surface.

The expression "the threshold bottom surface" means the bottom surface of the threshold gap.

The expressions "door sill" and "threshold" are used interchangeably and mean one and the same thing namely a board or the like mounted under a door leaf in order to provide A) a suitable bottom surface of the threshold gap and B) a protruding edge, against which the door leaf can press when closed.

The expressions "the front of a door" and "the front of a door leaf" means the side of the door/door leaf pointing in the direction, in which the door opens.

The expression "in front of a door" means in front of the front of the door.

The expression "the overpassed ground" means the ground in front of a door which is overpassed by the door leaf when the door is opened and closed.

The Main Problem and the Minimum Requirements for its Proper Solution

When a hinged swing door has been mounted in a building there will often be a significant gap between the bottom edge of the door leaf in closed position and the threshold bottom surface, i.e. a significant threshold gap. There are primarily 3 reasons for that:

- Firstly, it is desirable that the door leaf can pass unhindered over small obstacles in front of the door without being blocked, when the door is opened and closed. Such obstacles may e.g. be the ground in front of the door sloping negatively towards the door or a stone accidently lying in front of the door.
- Secondly the threshold bottom surface may be slanting. E.g. the left side may be 15 mm lower than the right side, and if the door is correctly mounted and the bottom of the door leaf therefore is horizontal, then the threshold gap will have to be least 15 mm higher on the left side than on the right side.
- Thirdly, it is necessary to have a threshold gap of a certain height because there always is a risk that the position of the door leaf will be changed downwards as times goes by and the building, the door and/or the hinges settles.

A significant threshold gap does unfortunately cause problems. It cannot keep out pests, wind and water. Furthermore, it is an undesirable thermal bridge. Such problems can often be reduced substantially by mounting a threshold with a protruding edge, towards which the lowermost part of the door leaf can press when in closed position. In many cases that is, however, not a useful option. This is e.g. not the case when goods are to be transported in and out of the door on pallet jacks. For in such cases the threshold would soon get smashed. Furthermore, the goods would often drop from the pallet jack, when it was to pass over the threshold. Because of this there is very often in many shops a door to the storage room with a significant threshold gap without any compensating threshold.

Such significant threshold gaps without compensating thresholds is a big problem, especially because it provides free access for rats and mice. Thus, a rat only needs 20 mm in order to enter under a door leaf and a mice can do with as little as 6 mm.

Rats and mice are capable of transmitting very dangerous contagious diseases, which can be transferred to humans via foods. Therefore, food enterprises are in many countries subject to one or more of the following requirements, which are aimed at reducing the risk for transfer of diseases to humans, when a rat or mouse has entered the premises of the food enterprise: A) The rat or mouse must be caught. B) All foods, which the rat or mouse may have been in contact with, must be destroyed. C) All parts of the enterprise, with which the rat or mouse may have been in contact, must be disinfected. D) The enterprise must close until the problem has been thoroughly solved.

Solving the problem is usually very costly and may run into several hundred thousand USD. Therefore, the annual losses due to rats and mice entering food enterprises are extremely high.

Although the main problem with rats and mice entering buildings through insufficiently sealed doors has been known for more than a century there has not until now been found any good and effective solution. In many countries the standard solution is for example the mounting of door seals in the form or high-density brushes integrated in a mounting strip of aluminum even though it is well known that they cannot keep out rats and mice.

The reason why the main problem has not been solved effectively long ago in spite of the seriousness and economic impact of the problem is undoubtedly, that an effective solution has to live up to a number of requirements, which are hard to meet simultaneously. Thus, when the door is a hinged swing door and the threshold gap is to be secured against rats and mice, an effective door seal must live up to the following minimum requirements:

1. The door seal must be so flexible round the horizontal plane (i.e. around an axis parallel to the bottom edge of the door leaf) so it can pass over any obstacles in front of the door, when the door is opened and closed.
2. The door seal must furthermore be so flexible round the horizontal plane that it even after many thousand slow or fast passages over an obstacle will return to its original form.
3. Even though the door seal must be flexible it must not be so soft that a rat or mouse can push it up and/or to the side and thereby pass the door leaf. This requires substantially less flexibility round the vertical plane (i.e. perpendicular to the bottom edge of the door leaf) than round the horizontal plane when the door seal is mounted.
4. There has to be some sort of barrier, even a rat with its very strong and special rodent teeth, which keep growing through the entire lifetime of the rat, cannot gnaw to pieces.
5. When the door is a double door with two door leaves, the two door seals mounted on the door leaves shall not only cover the two threshold gaps under the two door leaves but also the gap between the two threshold gaps, i.e. the gap under the astragal gap between the two door leaves, and that must be achieved without using a stiff mounting strip of metal or the like sticking out into the astragal gap, where there is a risk that such a protruding stiff mounting strip may hit and hurt people passing through the door.
6. The door seal must be so durable that it can stand many thousand door openings and closings without being prematurely worn out and this has to be the case even if there is some sort of obstacle in front of the door.

It is far from obvious how one can at the same time meet all the above requirements. This is the reason why it has taken so long before anyone found an effective solution.

The solution according to the disclosed embodiments has been tested at the independent Danish test institution Danish Technological Institute. The tests covered both durability and ability to resist prolonged attacks from rats. The tests were successful, and it is, therefore, substantiated that the invention actually does solve the main problem in an effective way.

Advantages—Other Than the Solution to the Main Problem

It is of course a substantial advantage that the main problem has been solved in a satisfactory way. On top of that the aspects of the disclosed embodiments offer several other advantages.

For example, when the doors are hinged swing doors and the door seals are mounted horizontally on the bottom parts of the door leaves in order to seal their threshold gaps, the door seals according to one or more embodiments of the second aspect of the present disclosure have the following other advantages compared to door seals presently on the market:

1. The door seals can in their entirety be produced from two cheap standard materials e.g. A) ordinary solid single-stranded steel wire and B) thermoplastic elastomer pellets (TPE).
2. The door seal can be produced in a single extrusion process by means of standard extrusion equipment and that is a very effective and cheap form of production.
3. The extruded door seal does not require any further processing—of course apart from the adaption to the measures of the door leaf, on which it is to be mounted.
4. The door seal can be mounted both with and without a mounting strip. Thus, it can e.g. be mounted by means of ordinary and cheap facade screws, which can be screwed through the door list and into the door leaf.
5. If a user wishes to mount the door seal with a mounting strip, the user is not bound to use any particular kind of mounting strip, in which the door seal is integrated. The user can freely choose any mounting strip, which live up to the user's individual requirements such as aesthetic or regulatory requirements.
6. When a door seal according to the present disclosure is mounted with a separate mounting strip, the mounting strip can be reused, as it does not constitute an integrated part of the door seal. Thereby, costs can be reduced and waste can be avoided to the benefit of both the user and the environment.
7. The door seal according to the disclosed embodiments can with ordinary metal scissors in just of few seconds and quite easily be adapted to the door leaf, on which it is to be mounted. This is especially an advantage compared to the traditional door seals with an integrated mounting strip of aluminum, where one has to use a hacksaw, an angle grinder or the like to shorten the door seal, and where there is a risk of losing bristles when shortening a high density brush door seal.
8. The door seal can be rolled into a relatively compact roll. E.g. a 3 mm thick, 75 mm broad and 25 m long door seal with 10 single stranded solid steel wires measuring 1 mm in diameter and without any integrated mounting strip can easily be rolled into a 75 mm broad roll with a diameter of only 40 cm. This is an appreciable advantage when one has to store or transport door seals. E.g. in the back of a carpenter's van it is far easier to administrate a small 7.5×40×40 cm box than 25 separate 1 meter long traditional door seals with an integrated mounting strip of aluminum.
9. The door seals on the market are sold in relatively short standard measures e.g. 1 and 2.5 m. Unavoidable this leads to a substantial waste, when the door seals are shortened in connection with the adaption to the concrete door leaves, on which they are to be mounted, and the superfluous stump it thrown away—to the detriment of the environment. Such waste can be almost eliminated when using the door seal according to the disclosed embodiments A) as is can easily be stored and transported in very long rolls and B) the user can cut off exactly the length needed for each door leaf, so the only waste is the very last piece which is too short for being mounted on a door.

10. The door seal according to the disclosed embodiments can be extruded or insert molded with a smooth surface, which is easy to clean effectively. This is a substantial advantage especially compared with the traditional high-density brush door seals, which tend to accumulate lots of dirt between the bristles, and which are quite impossible to clean effectively.
11. When a traditional high-density brush door seal accumulates dirt the bristles get stiff and sticky and clot together, and when this happens the high density brush gradually loses its sealing properties. The door seal according to the present disclosure does not suffer from this problem.
12. The basic structure of the door seal according to the disclosed embodiments is very solid. Therefore, the door seal is very resistant to violent impacts such as kicks even if it is mounted without a protecting mounting strip.
13. In cases where the door leaf will be subject to heavy impacts from pallet jacks and the like, the user can choose A) to mount the door seal according to the present disclosure with a broad and solid mounting strip made of steel and B) to mount the mounting strip in a way which gives good protection to the door seal as well as the door. With traditional door seals, which are produced with a relatively fragile integrated mounting seal typically made of aluminum, the user does not have that option.
14. The last e.g. 5 cm of the right or left end part of a horizontally mounted door seal according to the invention can easily be bend round a substantially vertical axis in an angel of about 90 degrees. Such a bend can e.g. with a screw be fastened to the hinged edge of the door leaf (the edge on which the hinges are mounted) or the leading edge of the door leaf (the edge on the side of the door leaf with the door handle). This means A) that the part of the threshold gap i) along the bottom of the hinged edge and ii) along the bottom of the leading edge can be sealed with an unbroken seal, which at the same time seals the threshold gap along the bottom of the frontside or the backside of the door leaf, and B) that this does not require any strenuous and technically weak assembly of multiple parts. It is of course a condition for this, that there is sufficient room in the gaps between the door leaf and the door jambs. However, that will often be the case as e.g. a 4 mm gap will be sufficient for a 3 mm thick door seal. This ability to seal the threshold gap along the bottom of the hinged edge and the leading edge of the door leaf is of great importance when it comes to keeping mice out, as they can enter through said parts of the threshold gap if one of the 2 gaps between the door leaf and the 2 door jambs is 6 mm or more. A traditional door seal with an integrated stiff mounting strip cannot be mounted in the same.
15. In cases where there isn't the necessary gap between the leading edge and the adjacent door jamb, which is mentioned in the preceding paragraph, the door seal can as an alternative to the mounting mentioned in the preceding paragraph be mounted so the end of the door seal without being bend protrudes from the door leaf and covers the gap between the leading edge of the door leaf and the adjacent door jamb. This is an operational solution because of the flexible nature of the door seal, as the flexibility makes it unlikely that the protruding portion of the door seal can hurt anyone passing through the door. This way of mounting does not provide a sealing as effective as the one described in the preceding paragraph, but it is better than the mounting of traditional door seals on the front or the back of the door leaf only without any protruding end parts. A traditional door seal with an integrated stiff mounting strip should not be mounted in the same way as the protruding part of the metal strip can hurt persons passing through the door.
16. If the threshold bottom surface is irregular the bottom edge of the door seal can with metal scissors easily be adapted so it fits the irregularities.
17. The door seal according to the disclosed embodiments is a continuous and unbroken barrier. It is therefore much better at hindering draft and protecting against high and low outdoor temperatures than the traditional high density brush door seals, where the wind relatively easy can pass between the bristles of the brush.
18. When the door seal according to the disclosed embodiments has been produced with elongated metal members in the whole width of the door seal without any integrated mounting strip, and the door seal has been worn out, the worn out door seal can be reused by inverting it so the sealing section becomes the mounting section and vice versa. This is especially relevant when the door seal is mounted by means of a separate mounting strip, as the separate mounting strip will cover the worn out former sealing section when the door seal has been remounted.
19. The door seal can be made with elongated metal members of spring steel. That will add further elasticity to the door seal thereby reinforcing some of the advantages. Firstly, it will make the door seal more resistant to violent impacts. Secondly, when the door seal is mounted with protruding end parts, it will reduce the risk of such protruding end parts hurting persons passing through the door.

The above is for presentation purposes limited to hinged swing doors. However, the aspects of the disclosed embodiments have a broader field of application and can with several of the abovementioned advantages also be used for other doors including sliding doors, saloon doors with bidirectional hinges, revolving doors, bifold doors and up-and-over doors.

An Unexpected Problem and its Solution

On the face of it one would think that ordinary solid and single stranded steel wires is the logical and best choice when choosing elongated metal members for a door seal according to the invention. This is because A) such wires provide better protection against rat attacks than multi stranded wires consisting of a plurality of much thinner and less gnaw resistant steel wires and B) such wire is a cheap standard product which can be bought in the form of 5 km long coils, which are very suitable for being used in an extrusion process.

However, the surface of ordinary solid and single stranded steel wires is smooth and in a practical implementation it has unexpectedly been found that this may generate a problem under very special circumstances. Thus, when a door seal according to the disclosed embodiments with such smooth wires has been mounted horizontally on the bottom part of a hinged door in order to secure the threshold gap, and the door seal several thousand times hits a serious obstacle in front of the door during the opening and closing of the door, some of the lowest positioned of the wires (closest to the threshold bottom surface) may gradually be forced out of one end of the door seal.

There are several ways, in which this problem may be solved or at least reduced:

1. At least a part of the lowermost 2.5 cm of the door seal may be provided with a fastener, which from both sides of the door seal sets said part of the door seal under pressure thereby increasing the friction between the wires and the flexible outer material. Examples of useful fasteners are A) rivets and B) screw bolts and nuts mounted through the door seal e.g. with a washer on each side of the door seal. Another example is clips.
2. One or both end parts of the horizontally mounted door seal may be provided with a bend of 60 to 180 degrees round a substantially vertical axis—preferably a bend of about 90 or about 180 degrees. A suitable length of the bent end part(s) may be 3-10 cm, such as 4-8 cm, such as about 5 cm. Each bend end part may be secured to the hinged edge or the leading edge of the door leaf, while the unbent main part of the door seal is mounted on the front or the back of the door leaf—especially if the bend is about 90 degrees. The bend may be in the whole width of the door seal but may also be limited to e.g. the lowermost part of the door seal e.g. the lowermost 25, 15 or 10 mm, in which case the bent lowermost part must in some way must be separated from the uppermost part of the door seal e.g. by cutting away the corresponding uppermost part. A vertical 180 degrees bend may be secured by means of A) a rivet, B) a screw or C) a screw bolt going through both layers of the door seal and into the door leaf. It may also be secured by means of A) a rivet or B) a screw bolt with a nut mounted through both layers of the bent part of the door seal e.g. with a washer on each side of the door seal. Furthermore, it may be secured by a clip. It may also be secured by a mounting strip pressing the bent end part of the door seal against the door leaf and thereby holding the 180 degrees bend in position.
3. The wires or at least the lowermost 2-3 wires may be coated with a primer—e.g. a zinc chromate primer—or another sort of adhesive coating e.g. a brass alloy coating, to which the flexible outer material adheres better than to the raw steel wire.
4. Wires with an uneven surface may be used instead of wires with a smooth surface as the rougher surface will provide more friction between the wires and the flexible outer material. This alternative choice may be limited to the lowermost 1-3 wires in order to keep costs low. Such wires with an uneven surface may be A) multi stranded wires or B) ordinary solid single stranded wires which have been deformed and thereby provided with an uneven and rougher surface by means of a mechanical or chemical process. One such method of mechanically deforming a solid single stranded wire is to let the wire pass between two wheels of hardened steel A) with a smaller distance between the wheels than the diameter of the wire and B) with an in relation to the longitudinal direction of the wire substantially transverse pattern, which is imprinted into the wire as it passes between the two wheels. A solid single stranded wire may also be deformed by shot blasting, sand blasting, glass blasting or chemical surface treatment such as sporadic treatment with a strong acid.

The above on how to solve the unexpected problem associated with the use of solid single stranded wires with a smooth surface apply mutatis mutandis to narrow metal strips with a similar smooth surface.

Electronically controlled doors such as automatic hinged swing doors and automatic sliding doors are normally equipped with a safety function, which stops the opening or closing of the door, if during the opening or closing an unusually resistance is registered. This is because such an unusual resistance may be caused by a person being hit by the opening or closing door leaf.

When a door seal according to the invention is mounted on such an electronically controlled door, the bottom part of the door seal may during opening or closing of the door come in contact with the threshold bottom surface or the overpassed ground in such a way, that it generates so much friction and resistance, that the safety function is triggered, and the opening or closing stops. This is not desirable. In order to solve this problem, the door seal must be equipped with something that reduces the friction and resistance without at the same time giving unrestricted access for pests and the wind. A solution to the problem is to secure short brushes or fibers to the bottom part of the door seal or to integrate the short brushes or fibers in the bottom part of the door seal.

Seals for Stationary Building Parts, Walls and Fences

The subject of the above is primarily the sealing of doors in buildings. However, the aspects of the disclosed embodiments have a broader field of application. Thus, the invented seal can also be used for sealing A) elongated gaps between other building parts—such as stationary building parts—and an adjacent surface B) elongated gaps between a wall and an adjacent surface and C) elongated gaps between fences and adjacent surfaces e.g. the ground. These further applications share lot of the advantages previously mentioned in relation to the application of the disclosed embodiments for the sealing of doors. Some of the advantages are explained in more detail below in connection with the description of the $6^{th}$ aspect of the disclosed embodiments.

$1^{st}$ Aspect—Flexible Seal With an Embedded Rat and Mice Secure Barrier

According to a first aspect of the disclosed embodiments there is provided an oblong blade seal of a flexible outer material comprising a plurality of substantially parallel elongated metal members in the form of A) metal wires, B) narrow metal strips or C) combinations of metal wires and narrow metal strips embedded in the flexible outer material with the elongated metal members arranged substantially in parallel to the longitudinal direction of the seal and at some distance to each other. The main purpose of the seal is to avoid entrance of A) animals such as rodents including mice and rats B), insects, and C) water. The seal may also help in controlling the physical atmosphere within a building by restricting air drafts so the interior may be more effectively heated or cooled. The purpose of the elongated metal members is to secure against rodents such as rats and mice gnawing their way through the seal. The elongated metal members do in other words serve as a barrier.

In a possible implementation form, the seal comprises a first section intended to seal a space or gap (the sealing section) and a second section (the mounting section) to be mounted A) on a door in a building, B) on another building part such as a stationary building part, C) on a wall or D) on a fence. The mounting section may be made of another material than the sealing section and may be with or without the embedded elongated metal members, while the sealing section must be with a plurality of the embedded elongated metal members. The structure of the seal may be symmetric with an entirely uniform structure so there is no apparent difference between the sealing section and the mounting section and it is up to the user to decide which part the user wishes to use as the mounting section for mounting purposes.

This first aspect is explained in more detail on the following pages with reference to FIGS. 1, 2, 3 and 4.

FIG. 1 is a partially cut away perspective view of a flexible seal 101 according to a first example embodiment, and FIG. 2 is a partially cut away perspective view of a flexible seal 201 according to a second example embodiment.

Each of the seals 101 and 201 has a flexible outer material with a first side part 102*a*, 202*a* and a second side part 102*b*, 202*b* encompassing a plurality of embedded metal wires 103, 203, where each of the wires 103, 203 run substantially in parallel to each other. The flexible seals 101, 201 have a longitudinal extension, and the metal wires 103, 203 run substantially in the longitudinal direction of the seal 101, 201. The substantially parallel metal wires 103, 203 are arranged at a distance to each other, and it is preferred that the metal wires 103, 203 are arranged with a substantially equal spacing. It is preferred that the flexible outer material 102*a*, 102*b*, 202*a*, 202*b* encompasses the embedded parallel metal wires 103, 203 only.

The upper part of the seal 101 with the uppermost 4 metal wires may serve as the mounting section while the lower part with the lowermost 5 metal wires may serve as the sealing section and vice versa.

The flexible outer material 102*a*, 102*b*, 202*a*, 202*b* may have a flattened form with a substantially constant or uniform thickness. The flexible outer material 102*a*, 102*b*, 202*a*, 202*b* may be made of a material selected from: A) a flexible polymer or plastic material, such as flexible polyvinyl chloride, PVC, and/or a flexible rubber material B) a flexible polymer material, which may be a material comprising a natural polymer material such as rubber and/or a synthetic polymer material such as synthetic rubber or a thermoplastic material or a polyvinyl chloride, PVC, material, and C) a thermoplastic elastomer (TPE) such as a thermoplastic vulcanizate (TPV)—e.g. Santoprene™, such as Santoprene™ 201-73.

The ratio between the thickness of the flexible outer material 102*a*, 102*b*, 202*a*, 202*b* and the Shore A hardness score of the flexible outer material (indirectly reflecting the flexibility of the material) may be in such a way that the result of a multiplication of the predominant thickness in mm by the Shore A score is a number in the range of 175-275, such as 190-275, such as 200-260, such as 210-250 such as 220-240.

The flexible outer material may have a thickness in the range of 2 to 30 mm, such as in the range of 2 to 20 mm, such as in the range of 2 to 10 mm, such as in the range of 2 to 5 mm, such as in the range of 2.5 to 4 mm, such as about 3 mm. The Shore A hardness score of the outer flexible material may be 45-90 such as 60-90, such as 65-88 such as 70-85, such as about 78.

In order to use the seals 101, 201 as a seal barrier for vermin and pests, such as rats or mice, the wires shall be dimensioned and made of a material, which the rats and/or mice cannot bite their way through. Thus, the wires shall have a thickness and be made of a material, which the rats and/or mice cannot bite through, and also the distance between the wires shall be so small, that the rats and/or mice cannot move in between the wires, even if they gnaw off the flexible outer material.

The wires 103, 203 may therefore be arranged at a distance to each other which is no larger than 20 mm, such as no larger than 19 mm, such as no larger than 18 mm, such as no larger than 17 mm, such as no larger than 15 mm, such as no larger than 12 mm, such as no larger than 10 mm, such as no larger than 9 mm, such as no larger than 8 mm, such as no larger than 7 mm, such as no larger than 6 mm, such as no larger than 5 mm, such as no larger than 4 mm, such as no larger than 3 mm, or such as no larger than 2 mm.

In a possible implementation form at least part of the wires 103, 203 in the sealing section are arranged at a distance to the nearest wire (i.e. to the neighboring wire) being no larger than 20 mm, such as no larger than 19 mm, such as no larger than 18 mm, such as no larger than 17 mm, such as no larger than 15 mm, such as no larger than 12 mm, such as no larger than 10 mm, such as no larger than 9 mm, such as no larger than 8 mm, such as no larger than 7 mm, such as no larger than 6 mm, such as no larger than 5 mm, such as no larger than 4 mm, such as no larger than 3 mm, or such as no larger than 2 mm.

The wires 103, 203 or some of them may be made of a selection of the following materials or alloys thereof: a) iron b) steel c) stainless steel d) spring steel e) welding wire filler metal such as 308L, 316L, 309L and 347 filler metal. The wires 103, 203 or some of them may a) be flexible multi stranded metal wires, such as braided or twisted wires with a natural uneven surface or b) single stranded wires with a smooth surface or an uneven surface. The metal wires 103, 203 or some of them can also be narrow metal strips having a width, which may be substantially equal to the thickness of the narrow metal strips, or in the range of one to three times the thickness of the narrow metal strips.

When using spring steel for the metal wires 103, 203 the seal 101, 201 gets an improved resistance against strokes or collisions. Moreover, a protruding part of a mounted seal with wires of spring steel is less likely to harm passing persons because of the extra flexibility and bending qualities.

The wires 103, 203 may have a thickness or diameter equal to or no less than 0.4 mm, equal to or no less than 0.6 mm, equal to or no less than 0.7 mm, equal to or no less than 0.8 mm, equal to or no less than 0.9 mm, equal to or no less than 1 mm, equal to or no less than 1.1 mm, equal to or no less than 1.2 mm, equal to or no less than 1.3 mm, equal to or no less than 1.4 mm, equal to or no less than 1.5 mm, equal to or no less than 1.6 mm, equal to or no less than 1.7 mm, equal to or no less than 1.8 mm, equal to or no less than 1.9 mm, equal to or no less than 2.0 mm, equal to or no less than 2.1 mm, equal to or no less than 2.2 mm, equal to or no less than 2.4 mm, equal to or no less than 2.7 mm, or equal to or no less than 3 mm.

When the wires 103, 203 are metal strips, the metal strips may have a width equal to or no less than 0.6 mm, equal to or no less than 0.8 mm, equal to or no less than 1 mm, equal to or no less than 1.5 mm, equal to or no less than 2 mm, or equal to or no less than 2.5 mm.

The seals 101, 201 may have a width in the range of 1.5 to 30 cm, such as in the range of 2 to 25 cm, such as in the range of 2 to 20 cm, such as in the range of 2 to 15 cm, such as in the range of 4 to 10 cm, such as in the range of 5 to 9 cm, such as about 6 cm or about 8 cm.

By having the metal wires 103, 203 running substantially in parallel, the seal 101, 201 can relatively easily bend or flex about an axis being substantially parallel to the metal wires 103, 203 and the longitudinal direction of the seal, while bending or flexing about an axis perpendicular to the parallel metal wires 103, 203 and the longitudinal direction of the seal will also be possible but to a lesser extent. The flexibility around the axis parallel to the longitudinal direction of the blade seal is substantially larger than the flexibility around the axis perpendicular to the longitudinal direction of the seal.

The main difference between the first seal 101 and the second seal 201 is that for the first seal 101, metal wires 103 are provided at a distance to each other in the whole width of the seal 101, while for the second seal 201, only a part of the seal 201 has metal wires 203 running substantially parallel to each other.

Thus, the flexible seal 201 has a first section (the sealing section) with a flexible outer material 202a, 202b encompassing a plurality of embedded metal wires 203 running substantially parallel to each other, where the first section has a maximum width defined by the maximum distance between the two outermost positioned metal wires 203 of the plurality of substantially parallel metal wires. The flexible seal 201 further has a second section (the mounting section) arranged next to the first section alongside one of the outermost positioned metal wires 203. The second section serves as a mounting section while the first section serves as a sealing section.

When using the flexible seal 201 e.g. mounted with a separate or integrated mounting strip on a door, it is not necessary to have metal wires in the part of the seal, which may be the second section, and which is used for mounting the seal 201 on the door. Thus, there is only need for having metal wires in the part of the seal, which may be the first section (the sealing section), and which is positioned below or besides the door. Thus, when mounted on a door with a mounting strip, the second section of the seal 201 may have a width, which has a maximum corresponding to the width of the mounting strip, whereby the second section may be fully covered by the mounting strip.

It is preferred that the second section of the seal 201 has a maximum width equal to or no less than one fifth of the maximum width of the first section, equal to or no less than one quarter of the maximum width of the first section, equal to or no less than one third of the maximum width of the first section, equal to or no less than half of the maximum width of the first section, equal to or no less than two thirds of the maximum width of the first section, equal to or no less than three quarters of the maximum width of the first section, or equal to or no less than the whole width of the first section.

In a specific embodiment the seal 201 has a total width of about 75 mm, the width of the first section is 55 mm, the second section has a width of 17 mm, and the width from the bottom of the seal 201 to the lowermost metal wire 203 is 3 mm.

Here, the seal 201 has a thickness of 3 mm, the metal wires are made of 308L welding wire with a diameter of 1 mm, the distance between neighboring metal wires 203 is about 6 mm, and the total number of metal wires is 10.

In a specific embodiment the seal 101 has a total width of about 60 mm and the distance from both of the edges of the seal 101 to the nearest metal wire 103 is about 3 mm. The seal 101 has a thickness of 3 mm. The metal wires 103 are made of stainless spring steel with a diameter of 1 mm. The distance between neighboring metal wires 103 is about 6 mm, and the total number of metal wires is 10.

It is within an embodiment of the disclosure that the distance from the lowermost arranged metal wire 103, 203 to the lower edge of the seal 101, 201 is smaller than the distance between neighboring arranged metal wires 103, 203. Thus, the distance from the lowermost arranged metal wire 103, 203 to the lower edge of the seal 101, 201 may be in the range of ⅔ to ⅓ or about half or below half of the distance between neighboring arranged metal wires 103, 203. If the wires 103, 203 for example are arranged at a distance to each other, which distance is at least 4 mm, such as 4 mm or 5 mm the distance from the lowermost arranged metal wire 103, 203 to the lower edge of the seal 101, 201 may be about 2 mm. If the wires 103, 203 are arranged at a distance to each other being about 6 mm, the distance from the lowermost arranged metal wire 103, 203 to the lower edge of the seal 101, 201 may be about 2 mm or 3 mm or in the range of 2-3 mm.

The flexible seals 101, 201 may have been produced by a single extrusion process or in a single insert molding process, in which case the first side parts 102a and 202a and the second side parts 102b and 202b constitute one single outer material, in which the wires 103, 203 are embedded. One material may be used for the sealing section and another for the mounting section. If so, one of the materials must be provided by on ore more inlets to the extruder or the mold while one or more other inlets must be used for providing the other material in such a way that one of the materials ends up in the sealing section and the other material ends up in the mounting section.

In a possible implementation form, the number of metal wires 103, 203 in the seal 101, 201 is at least 2, such as at least 3, such as at least 4, such as at least 5, such as at least 6, such as at least 7, such as at least 9, such as at least 10, such as at least 11, such as at least 13.

The number of metal wires 103, 203 in the sealing section is at least 2, such as at least 3, such as at least 4, such as at least 5, such as at least 6, such as at least 7, such as at least 9, such as at least 10.

In a possible implementation form of the seal 101, there are at least 2 metal wires 103 in the mounting section, such as at least 3, such as at least 4, such as at least 6, such as at least 8. One purpose of the wires in the mounting section is to reinforce the section in order to make mounting without a mounting strip an operational option e.g. so it becomes possible to mount the seal 101 securely by means of facade screws with screw heads spanning over two neighboring wires embedded in the mounting section. Another purpose is to make it possible to reuse a used seal 101 with a worn out or damaged sealing section by inverting it, so the former mounting section becomes the sealing section with a barrier of metal wires 103, and the former sealing section becomes the mounting section with reinforcing wires 103.

The flexible seals 101, 201 may be integrated into a stiff mounting strip of metal such as aluminum. However, it is preferred that they are not integrated into such a stiff mounting strip. The flexible seals 101, 201 may have a smooth and easy to clean surface.

One side of the mounting section of the seal 101, 201 may be provided with double sided tape which can hold the seal in place during the mounting process A) so the user does not need to use one hand for holding the door seal in place while mounting and B) the user can use both hands for handling tools, fasteners and—if the seal is to mounted with a separate mounting strip—a mounting strip.

FIGS. 3a, 3b and 3c show partially cut away perspective views of flexible seals 301a, 301b and 301c, according to example embodiments. The seal 301a of FIG. 3a is similar to the seal 201 of FIG. 2 in that the seal 301a has a first section with metal wires running substantially parallel to each other and a second section with no metal wires. The first section of the seal 301a is bent outwards or is at an angle relative to the second section, which holds no wires. Thus, when the seal 301a e.g. is used as a door or port seal, the second section may be connected to the lower part or the edge of the door, while the first section or a part thereof extends below the door edge at an angle pointing out in front of the door. The angle may make it more difficult for a rat to push the seal back and up. Furthermore, the angle can facilitate better adaption of the seal 301a to the ground surface—e.g. when mounted on the bottom of an up-and-over door.

The seal 301b of FIG. 3b is similar to the seal 201 of FIG. 2 in that the seal 301b has a first section with metal wires running substantially parallel to each other and a second section with no metal wires. For the seal 301b, the width of the second section is smaller than the width of the first section. The first section of the seal 301b is formed with several curves to provide the first section with increased flexibility. This can also facilitate better adaption of the seal to the ground surface.

The seal 301c of FIG. 3c is similar to the seal 101 of FIG. 1 in that the seal 301c has metal wires running substantially parallel to each other in the whole width of the seal 301c. The seal 301c is also formed with several curves to provide increased flexibility. This can likewise facilitate better adaption of the seal to the ground surface.

When the seals 301a, 301b and 301c are described as similar to the seal 101 or the seal 201 it means that everything stated about 101 or 201 applies mutatis mutandis.

In FIG. 4 the seal 401 has been provided with markings 402 indicating recommended positions for placing fasteners such as screws, rivets, screw bolts and nails. The seal is a seal like 101 of FIG. 1 with wires embedded in the mounting section. The marks are placed between two neighboring metal wires. There are two marks 402 for each 10 cm in the longitudinal direction of the seal—one in the upper part of the seal and one in the lower part of the seal. When using the recommended positions, the user can place the fasteners 100% consistently a) without use of any time-consuming measuring and b) without any risk of hitting the embedded metal wires. The marks 402 in the upper part may be used when first mounting the seal on a door by means of e.g. facade screws. The marks 402 in the lower part may be used when remounting the seal 401 after the lower sealing section has been worn out or damaged and the seal 401 is to be inverted and reused with the former lower sealing section as the upper mounting section and vice versa. The marks 402 may be made of ink or another material placed on the surface of the seal. The marks 402 may also be in the form of imprints in the outer flexible material of the seal 401. Such imprints can be made during the extrusion process if the seal 401 is extruded. During the extrusion process they can be made by 2 imprinting wheels—one on each side of the seal 401 putting it under pressure and imprinting the marks and any other characters placed on the outer perimeter of the wheels into the flexible outer material of the seal 401. Substantially in the middle between the 2 longitudinal edges of the seal 401 there is a continuous band of letters and other characters 403. The band of characters 403 may be used for marketing purposes e.g. by displaying a logo or trademark. It does, however, primarily serve a purely technical purpose, as a continuous band of characters on the perimeter of both the 2 imprinting wheels provides the friction between the 2 wheels and the outer flexible material, which is necessary for making the wheels turn automatically as the seal 401 passes between the 2 wheels. It is preferred that there are identical markings 402 for recommended fastener positions on both sides of the seal 401, so it does not matter how the user turns the seal 401 the first time it is to be mounted.

2$^{nd}$ Aspect—Flexible Door Seal With an Embedded Rat and Mice Secure Barrier

The a second aspect of the disclosed embodiments is directed to providing a seal according to any of the possible implementation forms of the first aspect for sealing a space between an edge of a door (e.g. the edge of a door leaf) and an adjacent surface said edge extending in a longitudinal direction and said flexible seal having a width for substantially forming a seal between said edge and the surface when connected to the edge of the door.

An implementation form of this second aspect is illustrated in FIG. 5, which is an isometric illustration of a lower edge door sealing assembly 500 according to an example embodiment, and in FIG. 6, which is an enlarged isometric illustration of a part of the lower edge door sealing assembly 500 of FIG. 5.

The seal assembly 500 of FIGS. 4 and 6 is arranged for sealing a space between a lower edge of a door 507 and an adjacent surface 510 (i.e. the threshold gap) to avoid entrance of animals. The seal assembly 500 comprises a flexible seal 501, which may be of the types 101 or 201 as described in connection with FIGS. 1 and 2. The seal assembly 500 may have at least one connector or connecting plate 506, which may be made of steel, stainless steel, springs steel or aluminum, and which connects the flexible seal 501 to the edge of the door 507. The connecting plate may be a separate mounting strip or a mounting strip, in which the flexible seal has been incorporated. The seal 501 may be connected to the door 507 by gluing.

By having the flexible end parts 504a and 504b, the flexible seal 501 can be arranged with the end parts 504a, 504b extending on both sides of the door leaf edge, to thereby obtain a close seal to the lower part of the frame of the door (i.e. the 2 door jambs).

The adjacent surface 510 may be a ground surface, a floor surface, a concrete surface, a threshold or a door sill and the gap may be the threshold gap. The adjacent surface may also be a door jamb. Furthermore, if the door is a double door with 2 door leaves the adjacent surface may also be the other door leaf.

When a door seal with a barrier of solid single stranded wires is mounted on the bottom of the door leaf of a hinged swing door in order to seal the threshold gap, it is as previously described an unexpected problem, that there under very special circumstances is a risk that the lowermost wires may be forced out of the end of the door seal.

The problem may be solved or at least reduced if the friction between the lowermost wires and the flexible outer material is increased e.g. by securing better adhesion of the flexible outer material to the wires. One way of obtaining this is to use solid single stranded wires with an uneven surface e.g. wires with a deformed surface. FIG. 7 show an example of such a deformed solid single stranded wire 701 with grooves 702 substantially perpendicular to the longitudinal direction of the wire. Instead of a deformed solid single stranded wire a multi stranded wire with its natural uneven surface may be used. Another way of obtaining better adhesion is to use solid single stranded wires with an at least partly coated or primed surface.

Thus, the surface of solid single stranded wires may be at least partly deformed, roughed, or surface treated e.g. at least partly fluted or grooved, chemically treated or etched, sandblasted, glass bead blasted, shot blasted, chromate coated, coated by a deformed coating material, coated by an adhesive coating, such as a brass alloy coating or coated by a primer coating such as a zinc chromate primer. The adhesion may also be improved by heating the wires to around 200 degrees Celsius just before extruding or insert molding the door seal.

The problem may also be solved or at least reduced by bending at least one end part of the door seal, as this can also provide an increased friction between wires and outer flexible material. FIG. 8 illustrates a door seal 801 like the seal 101 of FIG. 1, which has been provided with a bend 802. The bending angle is about 90 degrees and the seal has been bent substantially perpendicular to the longitudinal direction of the door seal. The door seal has been bent in one end only. However, the seal can also be bent in both ends. The door seal 801 is by means of facade screws 803 mounted on a door leaf 804 without use of any mounting strip. The bent end part of the seal 805 is secured to one of the edges of the door seal (i.e. on the hinge edge or the leading edge) 806 by means of one of the facade screws. The bending angle can also be about 60-180 degrees. If the angel is very different from 90 degrees such as about 180 degrees it will, however not be possible to secure the bent end part 805 to the edge of the door leaf. A bent end part with a bending angle of about 180 degrees can instead be secured A) to the unbent main part of the door seal or B) to the side of the door leaf, where the unbent main part of the door seal is mounted. An about 180 degrees bend may be in the whole width of the door seal but may also be limited to the lowermost part of the door seal e.g. the lowermost 25, 15 or 10 mm, in which case the bent lowermost part must in some way must be separated from the uppermost part of the door seal e.g. by cutting away the corresponding uppermost part. One end part can be bent in one angle e.g. an angle of about 90 degrees, while the other end part is bent in another angle e.g. an angle of about 180 degrees. It is of course also possible to have both end parts bent in the same angle.

The mounting of a bent end part of the door seal on an edge of the door leaf provides the added advantage that it seals the part of the threshold gap between the edge in question and the threshold bottom surface. This is especially of importance, when there is a gap of 6 mm or more between A) the hinged edge or the leading edge in question and B) the adjacent door jamb, as such a gap provides sufficient space for a mouse to pass through the gap and thereafter under the edge of the door leaf.

On FIG. 8 the end part 807 of the door seal 801 protrudes beyond the door leaf 804 and can seal the lower part of the gap between the door leaf and the adjacent door jamb (not shown). When the door seal 801 is mounted on the front of the door leaf, the protruding end part 807 may overlap the lock jamb but should not overlap the hinge jamb as such an overlap may cause problems when the door is opened and closed. It is the other way around when the door seal 801 is mounted on the backside of the door leaf.

FIGS. 9a-9d show a flexible door seal 901 provided with a brush. The seal 901 corresponds to the seals 101 or 201 of FIGS. 1 and 2 but here the seal 901 is provided with a connection part 902 for holding a brush or fiber material. The brush is here in the form of a detachable brush strip 903 with bristles extending below the flexible outer material of the door seal 901. The brush or fiber material may be integrated into the flexible outer material instead of being attached to it. If so the brush or fiber material may be integrated during an extrusion or insert molding process, in which the flexible outer material is extruded or insert molded together with the elongated metal members. An advantage of detachable strips compared to integrated ones, is that they can easily be removed and replaced when they get worn out or damaged. Detachable strips should be secured with suitable fasteners.

The purpose of the brush 903 or fiber material is to reduce the friction between the flexible outer material and A) the threshold bottom surface and B) the overpassed ground in order to avoid, that the friction triggers the electronic control mechanisms of electronically controlled doors with horizontal opening and closing movements—e.g. electronically controlled sliding doors and swing doors.

In a possible implementation form, the extension of the brush or fiber material below the flexible outer material is no larger than 6 mm, such as no larger than 5 mm, such as no larger than 4 mm, such as no larger than 3 mm, or such as no larger than 2 mm.

In order to prevent pest such as rats or mice to gnaw through the door seal, it is important that the lowermost metal wire or strip is arranged close to the bottom edge of the flexible outer material. Thus, in a possible implementation form of the fourth aspect, the bottom part of the flexible outer material has a lower edge, and the spacing between the lower edge and a lowermost positioned metal wire or strip is no larger than 3, such as no larger than 2, such as no larger than 1.5 mm, or such as no larger than 1 mm.

In a possible implementation form, a bottom groove is formed in the lowermost surface of said bottom part, and the brush or fiber material is attached to the bottom part within said bottom groove. The brushes or strip of brushes may be secured to a metal strip or within a metal channel strip, which metal strip may be arranged within the bottom groove, thereby holding the brushes in position at the bottom part of the flexible outer material. Thus, the brushes or strip of brushes may be detachable arranged or attached to the bottom part of the flexible outer material.

In a possible implementation form, the brush or fiber material is secured to a connection part, and the connection part is further secured to the bottom part of the flexible outer material. The connection part may be formed by a metal, such as formed by aluminum.

FIG. 10 illustrates a bottom sealed swing door assembly 1000 having two oppositely arranged hinged door wings or halves, a first door half 1001a and a second door half 1001b. A first seal 1002a is connected to the lower edge of the first door half 1001a by a connecting plate 1003a, and a second seal 1002b is connected to the lower edge of the second door half 1001b by a connecting plate 1003b. The first and second seals 1002a and 1002b may each be a flexible seal of the type 101, 201, 301a, 301b, 301c, 401 and 901 of FIGS. 1, 2, 3a, 3b, 3c, 4 and 9. The sealed door assembly 1000 is further provided with a vertical arranged flexible seal 1002c connected to the second door half 1001b by a connecting plate 1003c for sealing the opening between the first and second door halves 1001a and 1001b (the astragal gap) when the door halves 1001a and 1001b are closed.

The first and second seals 1002a and 1002b may be mounted so their end parts at least partly overlap where they meet in the middle of the door assembly 1000 when the door assembly is closed thereby closing at least a part of the gap between the two threshold gaps (i.e. the space under the bottom of the astragal gap between the two door leaves 1001a and 1001b) and possibly also the lowermost part of the astragal gap.

The metal wires mentioned in all the above implementation forms of the $2^{nd}$ aspect may also be A) narrow metal strips or B) combinations of metal wires and narrow metal strips.

3rd Aspect—Use of Flexible Seal for Sealing a Door in a Building

The third aspect of the present disclosure is a method of A) securing a door in a building against pests such as rats and mice, B) preventing water from entering a building through a door and/or C) limiting air drafts through gaps between a door leaf of a door in a building and a surface adjacent to the door leaf and thereby making it easier to control the temperature in a room behind the door said method comprising the step of mounting a blade seal according to any one of the implementation forms of the 1$^{st}$ and 2$^{nd}$ aspects on the door.

The method may comprise one or more of the following steps:
  Mounting at least a part of the blade seal on the exterior side of a door leaf.
  Mounting at least a part of the blade seal on the interior side of a door leaf.
  Mounting at least a part of the blade seal on the hinged edge of a door leaf.
  Mounting at least a part of the blade seal on the leading edge of a door leaf.
  Mounting at least a part of the blade seal by means of a mounting strip in accordance with any of the implementation forms of the 5$^{th}$ aspect of the disclosed embodiments.
  Mounting the blade seal in order to seal a threshold gap.

The method may comprise one or more of the following steps:
  At least one end part of the blade seal is bent in an angle of 60-120 degrees preferably about 90 degrees, and the bent end part is thereafter secured to the hinged edge of the door leaf or the leading edge of the door leaf—e.g. by a rivet, a screw, a screw bolt or another fastener.
  At least a part of an end part of the blade seal is bent in an angle of 150-180 degrees preferably about 180 degrees and the bending angel is thereafter secured a) by fastening the bent end part to the door leaf—e.g. by a rivet, a screw, a screw bolt or another fastener—or b) by fixating the bent end part to the main part of the blade seal—e.g. by a rivet, a screw bolt, a cable tie, a clip or another fastener.

When the door is a double door the method may comprise the step of mounting 2 blade seals horizontally at the bottom of the 2 door leaves in such a way that said blade seals overlap in the astragal gap between the 2 door leaves.

When the door is a single door the method may comprise the step of mounting a blade seal horizontally at the bottom of the door leaf in such a way that said door seal protrudes from the leading edge of the door leaf and overlaps at least a part of the lock jamb of the door.

4th Aspect—Method for Producing a Flexible Door Seal

According to a fourth aspect of the disclosed embodiments, there is provided a method for producing a flexible blade seal according to any of the implementation forms of the first and second aspects, where the seal is produced by an extrusion process or by insert molding.

In a possible implementation form of the fourth aspect, the method for producing the flexible door seal by extrusion comprises the following step: At least one of the elongated metal members is heated to a temperature in the range of 175 to 225° C. before being fed into the extruder die.

The purpose of the heating of the elongated metal members is to secure a better attachment of the flexible outer material to the elongated metal members.

In a possible implementation form of the fourth aspect at least one of the elongated metal members is heated to the said temperature before production of the door seal by means of insert molding.

In a possible implementation form of the fourth aspect, at least one of the elongated metal members is a solid single stranded metal wire, a multi stranded metal wire or a solid narrow metal strip which is at least partly deformed, roughed, surface treated or primed—e.g. at least partly fluted or grooved, chemically treated or etched, sandblasted, glass bead blasted, shot blasted, chromate coated, coated by a deformed coating material, coated by an adhesive coating, such as a brass alloy coating or coated by a primer coating such as a zinc chromate primer—before being embedded in the flexible outer material during the extrusion or insert molding process.

5th Aspect—A Mounting Strip for Mounting a Door Seal

FIGS. 11a, 11b, 11c and 11d show mounting strips for mounting a door seal according to any of the implementation forms of the second aspect of the disclosed embodiments on the lower part of a door leaf in order to seal the underlying threshold gap. FIG. 11a is a straight mounting strip 1101 with pre-drilled holes 1102.

The distance a) between the leftmost holes b) between the leftmost hole and the left edge and c) between the rightmost hole and the right edge is relatively small. Said relatively small distances could be 1-8 cm, such as 2-6 cm, such as about 3-5 cm. The number of predrilled holes 1102 could be 5-20, such as 8-15, such as 10-12. The length of the mounting strip 1101 could be at least 85 cm, at least 90 cm, at least 95 cm or at least 100 cm. The width of the mounting strip 1101 may be 20-80 mm, such as 25-60 mm, such as 30-50 mm, such as about 40 mm. The thickness of the strip 1101 may be 2-5 mm, such as 2.5-4 mm, such as about 3 mm. It may be made of a hard polymer material, iron, steel, stainless steel or spring steel.

When adapting the length of the mounting strip to the width of the door leaf, on which it is to be mounted, the user can cut off the relevant part of the left end with the high concentration of holes and be sure to have a useful hole conveniently close to both edges of the mounting strip.

FIG. 11b is the same mounting strip as 11a seen from above.

FIG. 11c is a mounting strip 1103 similar to the mounting strip 1101 of FIG. 11a with pre-drilled holes 1104 but a) with a bayonet shaped bend 1105 in the rightmost end and b) with a pre-drilled hole 1106 in the bent end part. The length of the end part with the bayonet bend 1105 may be 3-10 cm, such as 4-8 cm, such as about 5 cm. The depth of the bend 1105 may be 5-15 mm, such as 6-12 mm, such as 7-10 mm.

The mounting strip 1103 can be used for mounting door seals according to the 2$^{nd}$ aspect of the disclosed embodiments with a 180 degrees bend in one end part of the door seal in such a way that the bent end part of the mounting strip 1105 partly covers the bent end part of the door seal and secures the 180 degrees angle of the bend by pressing the bent end part of the door seal against the door leaf, on which the door seal and the mounting strip is mounted. The mounting strip 1103 can also be used for mounting door seals without a bent end part, in which case the end part with the bayonet bend 1105 should be cut off when adapting the length of the mounting strip 1103 to the width of the door, on which the mounting strip 1103 is to be mounted.

FIG. 11*d* is the same mounting strip as 11*c* seen from above.

It is preferred that the holes of the mounting strip of FIGS. 11*c* and 11*d* are placed substantially on a line in the middle between the 2 longitudinal edges of the mounting strip, so the distance between the holes and the upper edge is the same when mounting the mounting strip horizontally on a door no matter if the bent end part is mounted to the right or to the left. This is an advantage as it makes it unnecessary to have 2 versions of the mounting strip—one for bent end parts mounted to the right and another for bent end parts mounted to the left.

6$^{th}$ Aspect—A Flexible Seal for Other (Stationary) Building Parts, Walls and Fences Against Rats and Mice The problem with invading rats and mice is not limited to rats and mice forcing their way through doors in buildings. Thus, invasion of rats and mice a) through stationary gaps in buildings, b) through gaps between fences and the ground and c) through gaps between buildings and walls or fences is also a very substantial problem. Fortunately, the seal according the first aspect can also advantageously be used for securing other building parts than doors against rats and mice. Thus, the embodiments of the seal according to the first aspect can be used for securing a) elongated stationary gaps in buildings, b) elongated gaps between fences and the ground and c) elongated gaps between buildings and walls or fences.

Such uses of the seals according to the first aspect have a lot of advantages, which are similar to the many advantages related to the use of the seals as door seals. E.g. when sealing the gap between a long fence and the ground it is a very substantial advantage, that the seal can be mounted in very long and flexible sections which can be bend unbroken round corners. Another good example is that the flexibility and the easy and fast adaption with metal scissors makes it relatively easy effectively to secure against rats and mice. When the aforementioned elongated gaps are to be secured against rats and mice the usually applied solutions is a stiff and inflexible barriers such as a fiber cement plank or a piece of stiff steel mesh with small holes. These standard solutions suffer from the disadvantage that a kick, blow or the like may easily A) punch holes in the fiber cement or B) deform the stiff steel mesh permanently. Both the punched holes in the cement fiber and the deformation of the stiff steel mesh may provide sufficient space for rats and mice to pass the barrier. As the seal according to the invention is flexible and very durable, it does not suffer from these disadvantages. It can "bend with the wind" and thereafter return to its original shape and position, when subjected to such kicks and blows.

The effective sealing of different types of stationary gaps in buildings requires seals with different cross-sectional designs. FIGS. 12*a*, 12*b* and 12*c* show 3 examples of such special designs 1201, 1203, 1205 having a substantially L-shaped, a substantially J-shaped and a substantially U-shaped cross-sectional form with embedded elongated metal members 1202, 1204, 1206. The mounting section of the J-shaped seal 1203 is the straight part of the J, while the rounded part is the sealing section. With these 3 designs and with the designs described as embodiments of the first aspect of the disclosed embodiments one will be able to secure most A) elongated stationary gaps between building parts and adjacent surfaces including surfaces of other building parts B) elongated gaps between fences and adjacent surfaces e.g. the ground and D) elongated gaps between walls and adjacent surfaces.

EXAMPLE 1

Three door seals according to the invention were tested for their ability to resist persistent rat attacks. The test was designed and carried out by the independent Danish test institute Danish Technological Institute.

The door seals were (3 mm thick and 75 mm wide) made of Santoprene™ 201-73 (a TPV with a Shore A hardness score of 78) and solid single stranded steel wires with a diameter of 1 mm. These were the sole components of the door seals. Ten parallel steel wires were embedded in the Santoprene flexible outer material to form each door seal. The door seals were produced by simultaneous extrusion of the TPV Santoprene™ 201-73 and the steel wires. The distance between neighboring steel wires was 5 mm. The first steel wire was embedded 3 mm from one of the edges, and the tenth steel wire was embedded 17 mm from the opposite edge.

The 3 door seals were tested on a double swing door of steel with each door leaf mounted on 2 hinges. Each of the door leaves was 85 cm broad. The astragal gap i.e. the distance between the leading edges of the 2 door leaves when closed was 8 mm. A broad steel strip was mounted under the double door.

The threshold gap i.e. the distance between the bottom edges of the 2 door leaves when closed and the underlying steel strip was approx. 45 mm.

The two rats used in the test were male rats of average size and in good health conditions. Danish Technological Institute provided the rats.

The bottom of the quadrangular test box, in which the double door was mounted, and in which the test was performed, was 1.8 meter by 1.5 meter. The test box was 0.6 meter high. On top of the box there was a plywood plate with Plexiglas windows, so the rats could be observed without taking off the top plate. Attached to one end of the test box there was a small cage where the 2 rats could sleep. Attached to the opposite end of the box there was another small cage, where food was served during the first week of the 2-week test period (the feeding cage). The double door was mounted in the middle of the test box and divided into 2 halves of equal size. The double door was closed during the entire 2 week test period.

The 3 door seals were mounted on the 2 door leaves by means of 3 mounting strips of stainless steel. The steel strips were 2 mm thick and 38 mm broad. The steel strips were fastened to the door leaves by rivets.

The 2 threshold gaps were covered by 2 door seals mounted horizontally on the bottom of the 2 door leaves. The astragal gap was covered by the 3rd door seal, which was mounted vertically on the active door leaf (i.e. the door leaf to be swung open first when opening the double door). The 2 horizontally mounted door seals partly overlapped with each other, where they met in the middle of the double door. The horizontal overlap was 7 mm.

The length of the 3 door seals was as follows: A) The door seal horizontally mounted on the active door leaf: 860 mm. B) The door seal vertically mounted on the active door leaf: 500 mm. C) The door seal horizontally mounted on the passive door leaf: 855 mm.

The 3 steel strips were mounted on the door leaves in line with the edges of the door leaves so no part of the steel strips covered any part of the astragal gap or the threshold gaps— except the end pieces of the horizontally mounted steel strips, which both covered 3 mm of the lowermost part of the astragal gap (leaving a 2 mm wide vertical gap between the end parts of the 2 steel strips). With the said exception the astragal gap and the threshold gaps were only covered by the door seals. The 2 horizontally mounted seals were mounted with their 17 mm wide sections containing no steel wires upwards. Said 17 mm wide sections were entirely covered by the steel strips—except in the very small part of the astragal gap, where the 2 door seals overlapped without being covered by the mounting strips. The uppermost 30 mm of the 2 horizontally mounted seals constituted the mounting section of said 2 door seals, while the lowermost 45 mm constituted the sealing section.

The test was performed over a 14 days period in May 2017. In the beginning of the test period none of the door seals were mounted. The rats could, therefore, freely pass under the door leaves through the 45 mm threshold gaps.

During the first 7 days, the rats were fed generously in the feeding cage. On day 8 the 3 door seals were mounted. They blocked the rats' access to the half of the test box, where the rats were used to be fed (the feeding half).

The next 7 days, the 2 rats were fed less generously, and they were fed in the half of the test box, where they slept (the sleeping half). Even though the diet was reduced, it was sufficient to keep them in good health and alert. The rats' favorite food such as an open sandwich with eggs and shrimps was placed on the bottom of the feeding half of the test box and a fan was placed behind the food in order to blow the smell of the food through chinks in the double door to the rats in the sleeping half.

The purpose of changing the diet and placing favorite food in the feeding half was to make them interested in overcoming the introduced obstacle between the 2 halves of the test box—i.e. to make them interested in attacking the door seals and entering the feeding half.

The 2 rats did—as they were supposed to—try to gnaw their way through the door seals. The rats succeeded in gnawing off several centimeters of the Santoprene™, but the partly bare steel wires maintained their ability to repel the attacks even though they had been laid open. The rats also attempted to push the horizontally mounted door seals up in order to pass under them, but that attempt was also unsuccessful. The door seals passed the test as the rats did not manage to enter the feeding half with their favorite foods.

BRIEF DESCRIPTION OF THE DRAWINGS

FIGS. 9a, 9b, 9c and 9d illustrate a flexible seal provided with a brush or fiber material.

Figure 1:
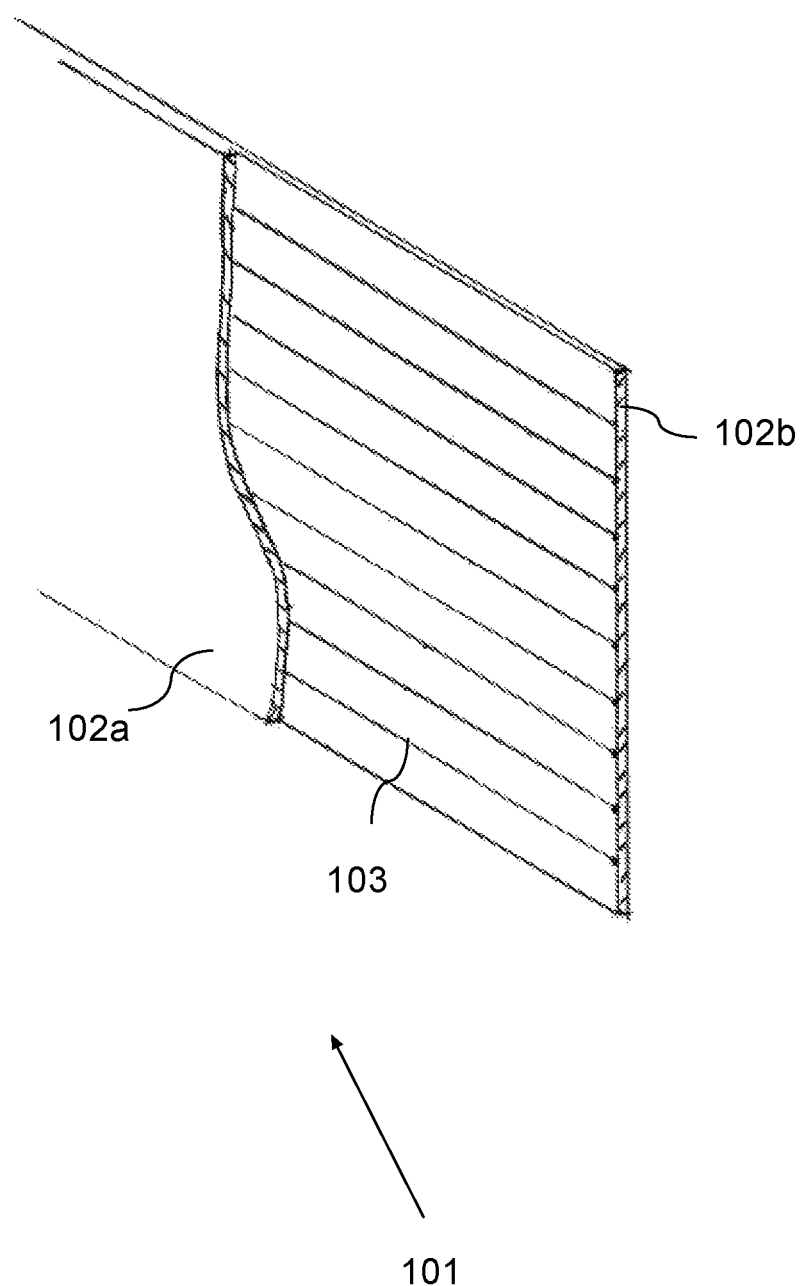
FIG. 1 is a partially cut away perspective view of a flexible seal.
Figure 2:
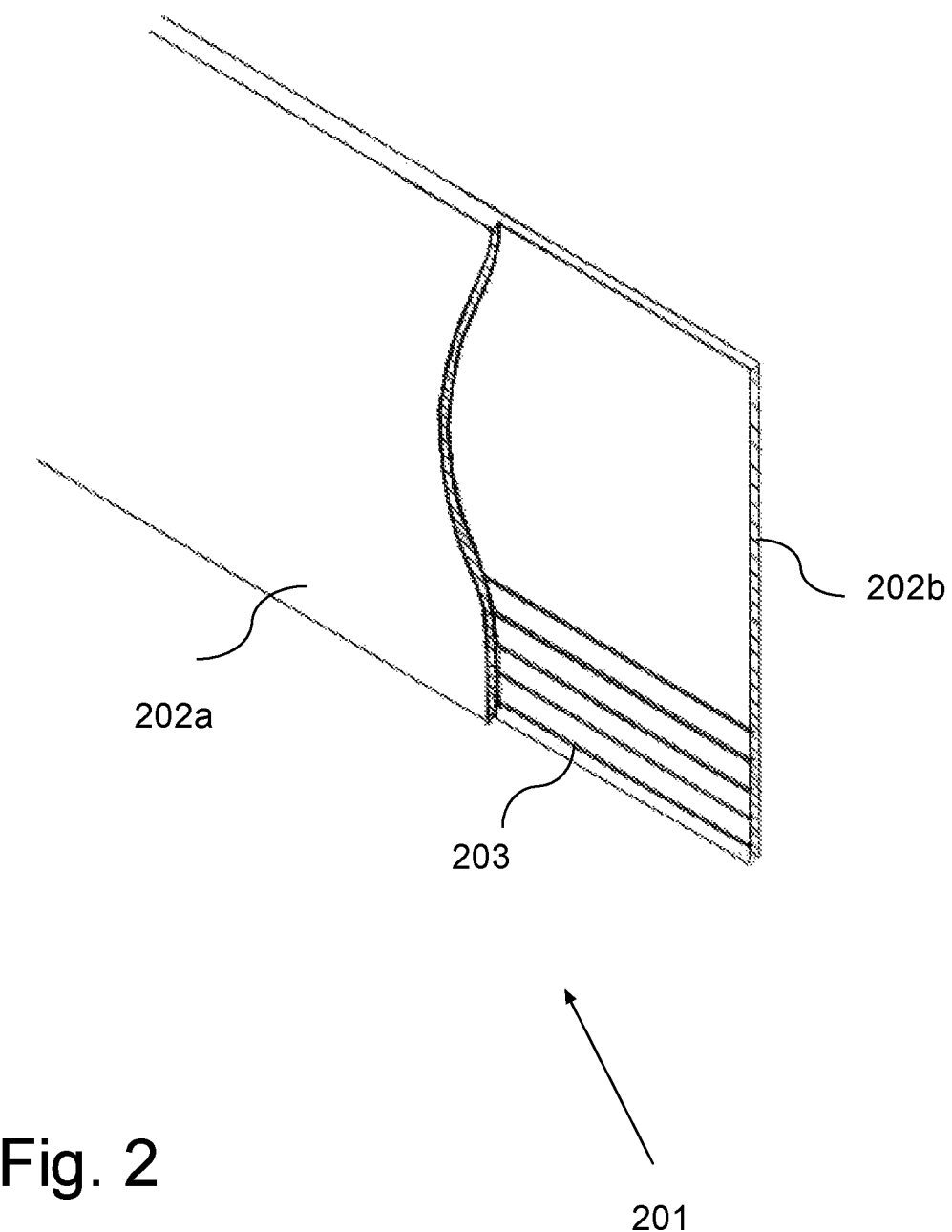
FIG. 2 is a partially cut away perspective view of a flexible seal.
Figure 3A:
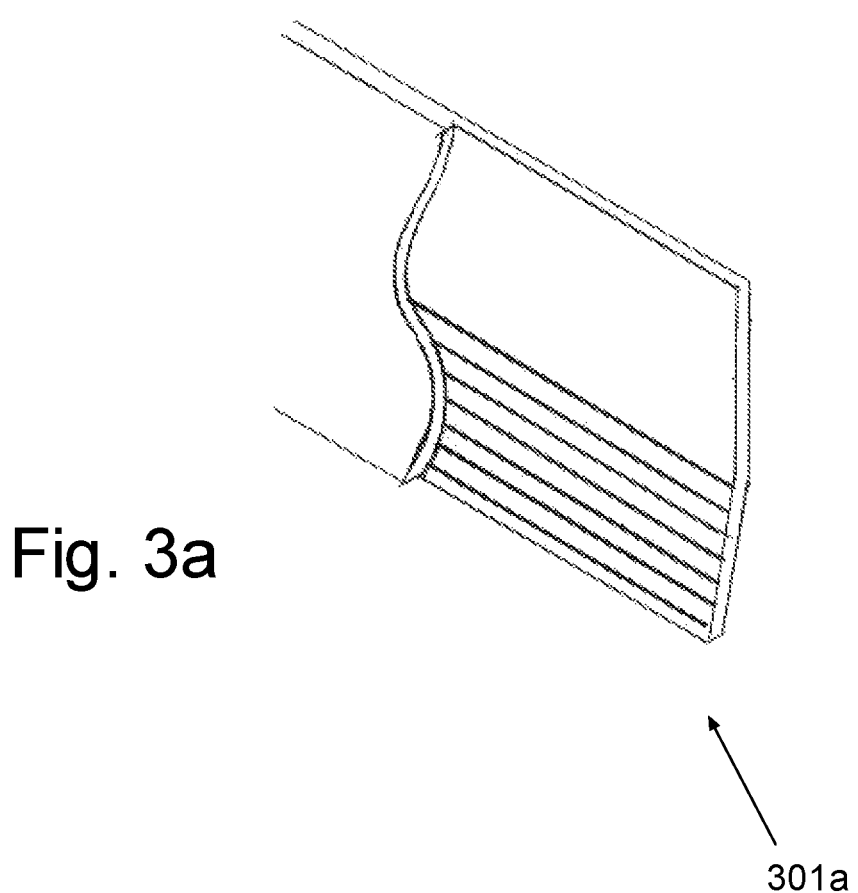
FIGS. 3a, 3b and 3c are partially cut away perspective views of seals.
Figure 3B:
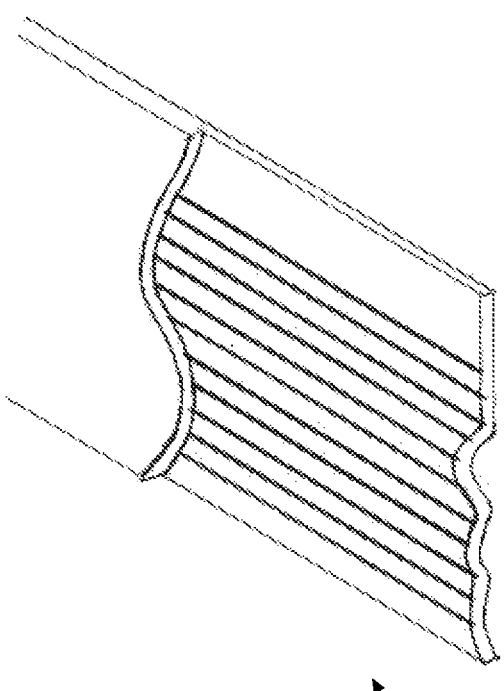
Figure 3C:
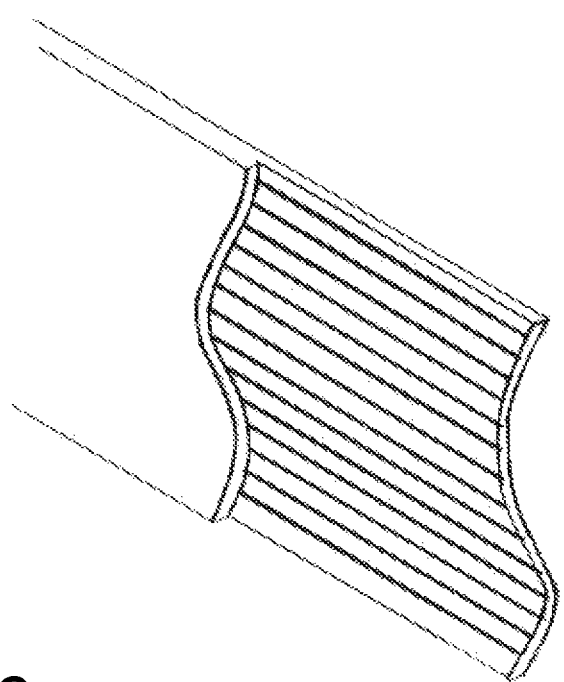
Figure 4:
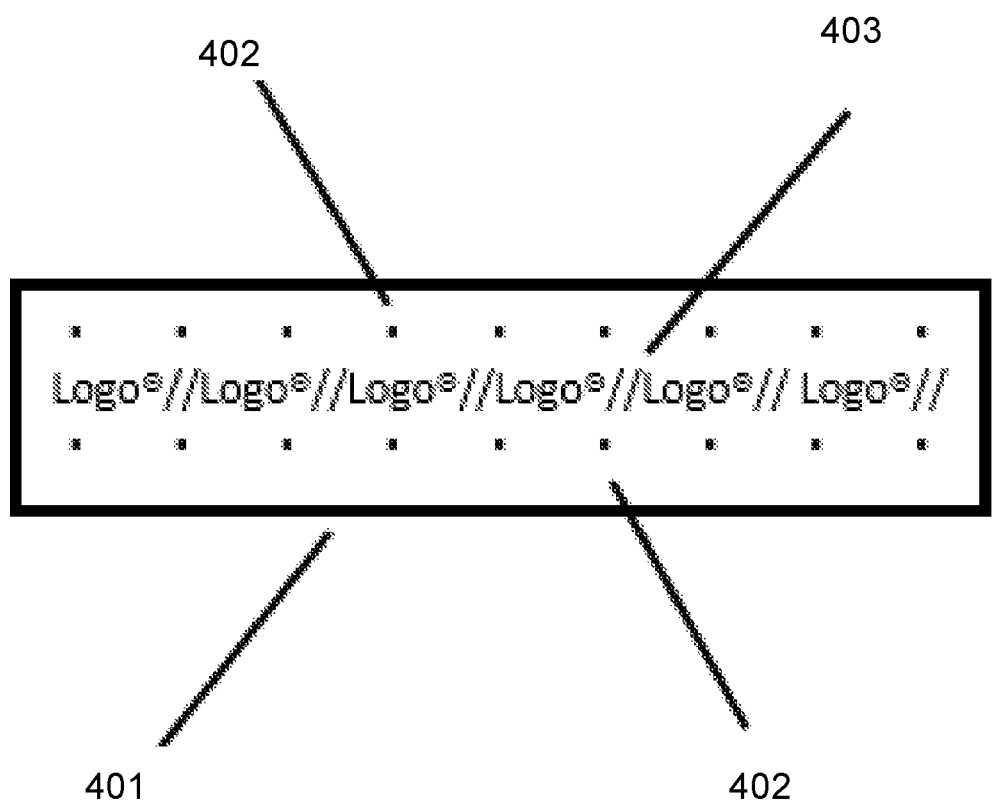
FIG. 4 is a door seal with markings of recommended positioning of fasteners such as screws.
Figure 5:
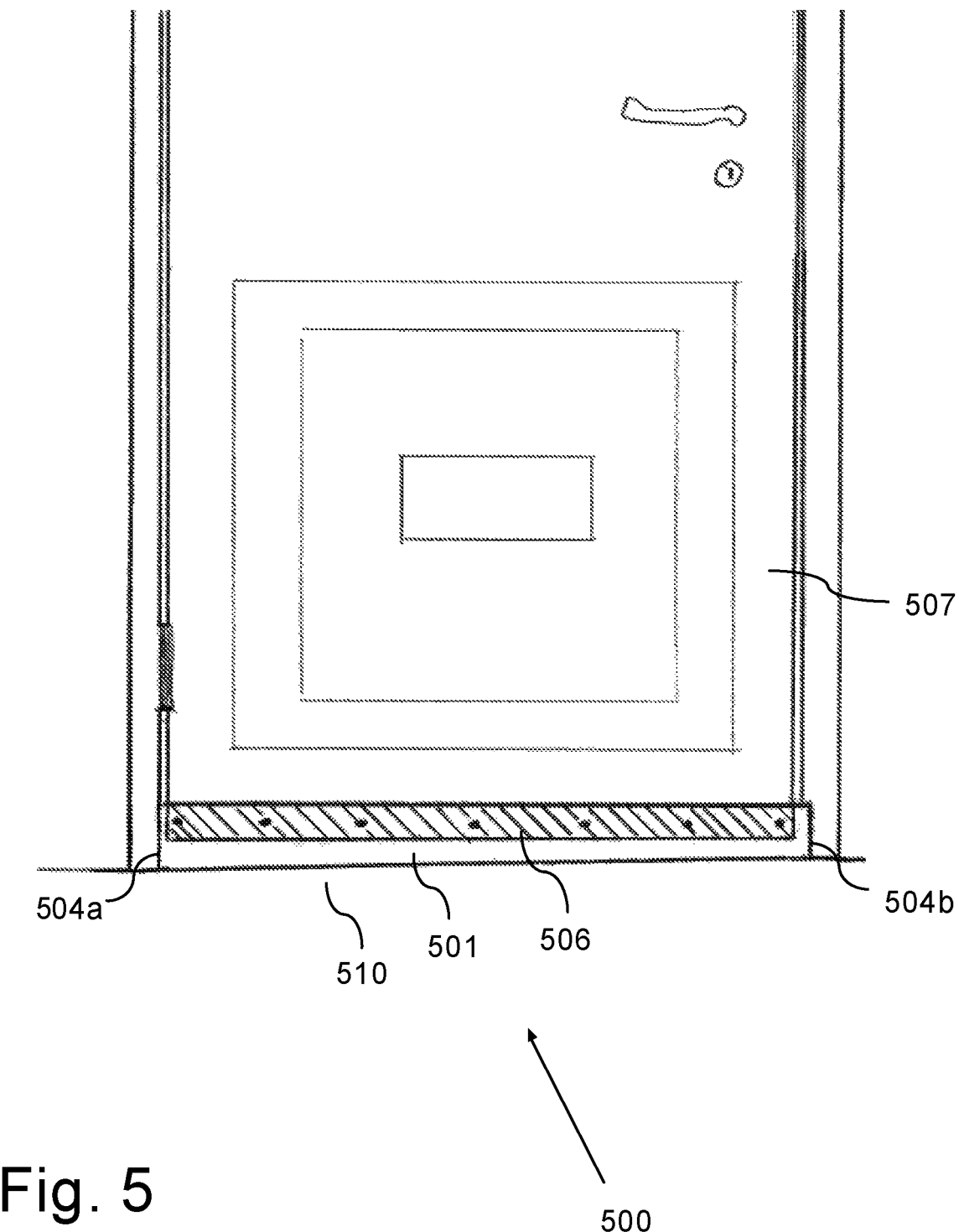
FIG. 5 is an isometric illustration of a lower edge door sealing assembly.
Figure 6:
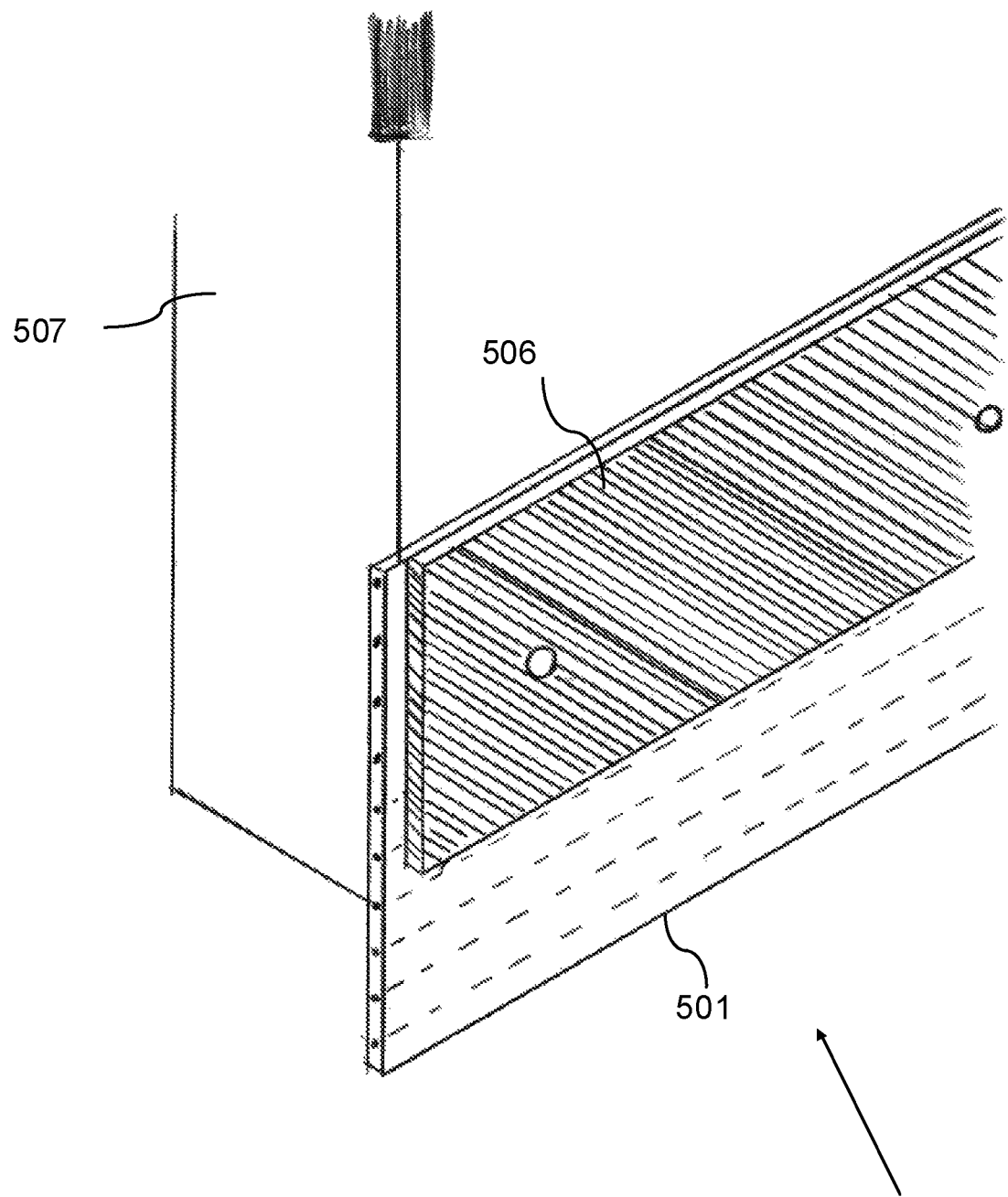
FIG. 6 is an illustration of a part of the lower edge door sealing assembly of FIG. 5.
Figure 7:
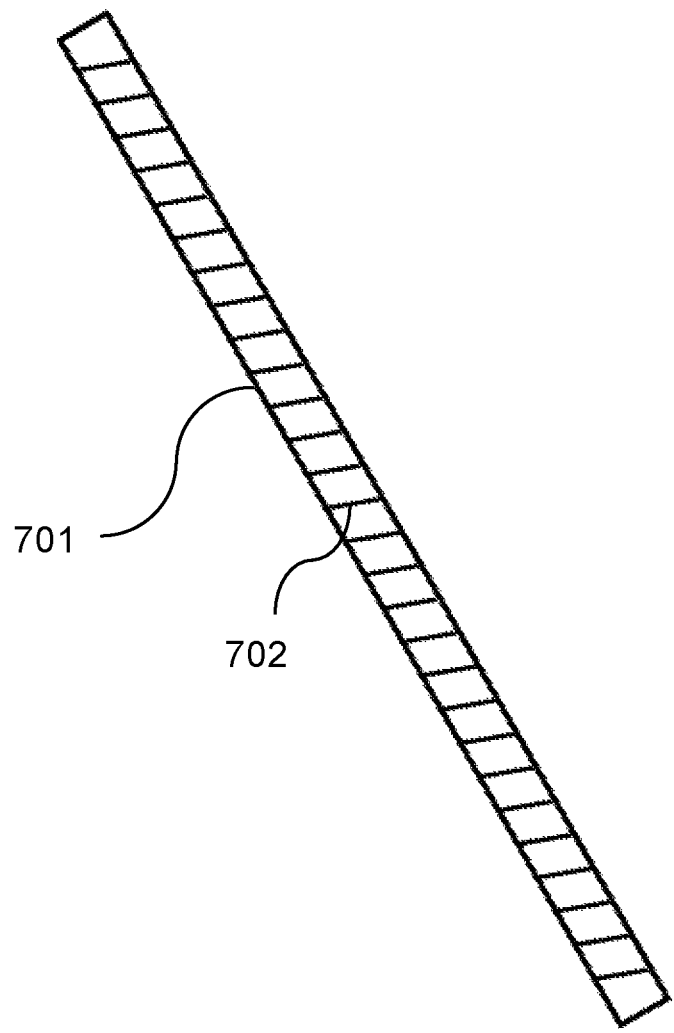
FIG. 7 is a solid single stranded wire with a deformed uneven surface.
Figure 8:
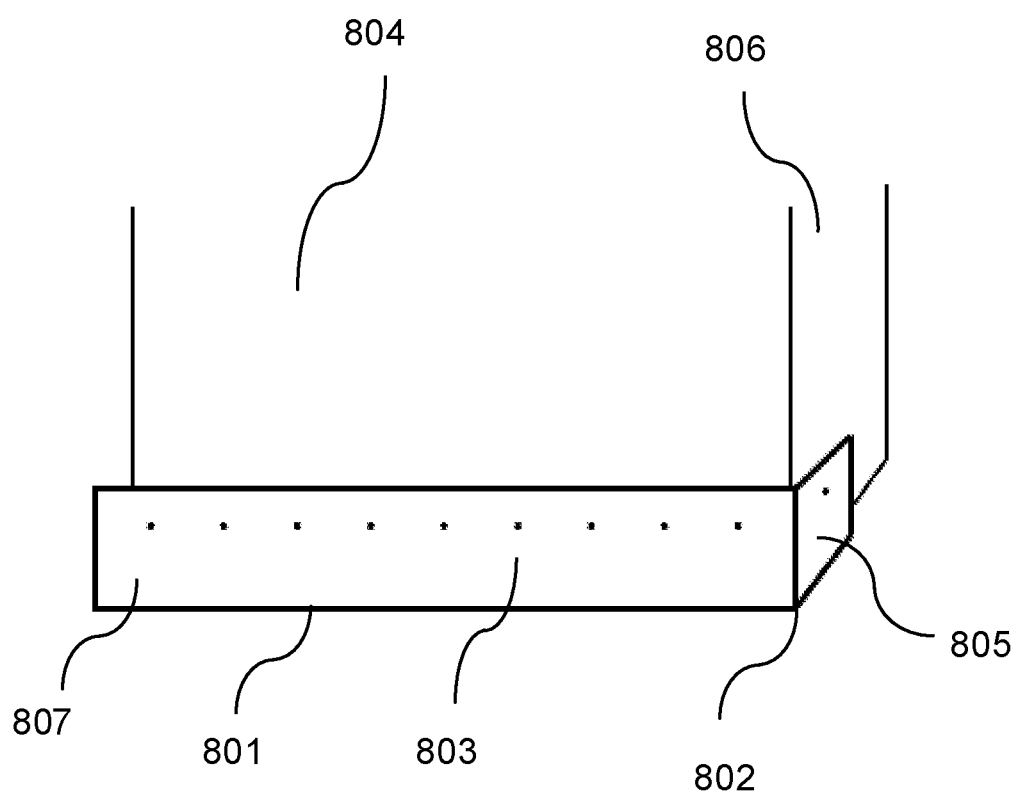
FIG. 8 is door seal with a bend mounted on the lower part of a door leaf with an end part of the door seal protruding from a side of the door leaf.
Figure 10:
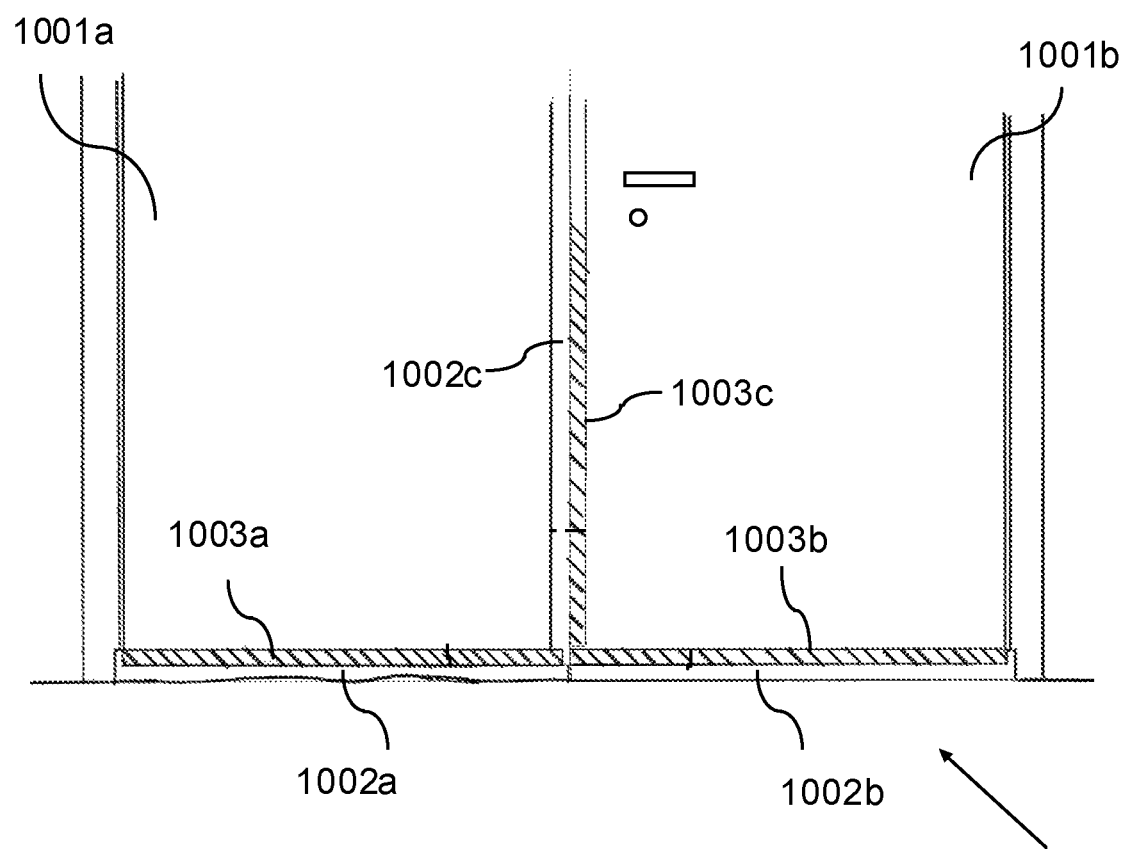
FIG. 10 illustrates a sealed door assembly with two door leaves.
Figure 11A:
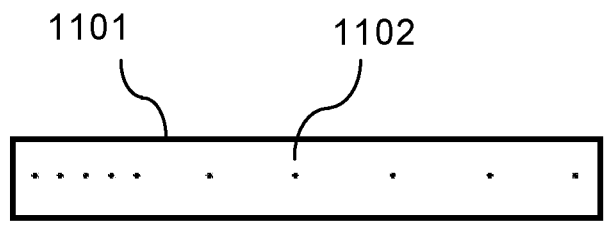
FIGS. 11a, 11b, 11c and 11d are mounting strips for mounting a door seal.
Figure 11B:
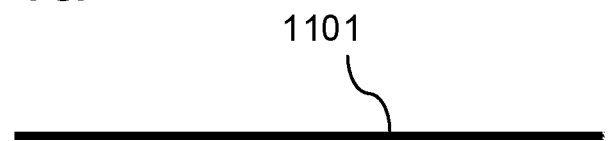
Figure 11C:
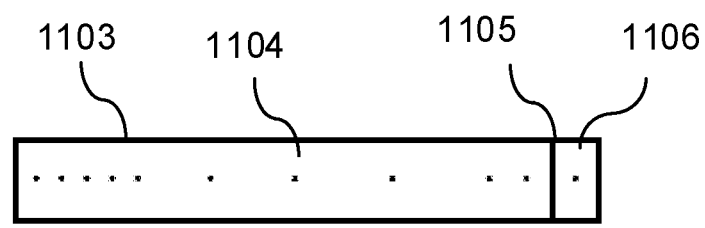
Figure 11D:
Figure 12A:
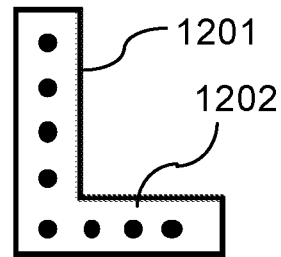
FIGS. 12a, 12b and 12c are L-shaped, J-shaped and U-shaped seals.
Figure 12B:
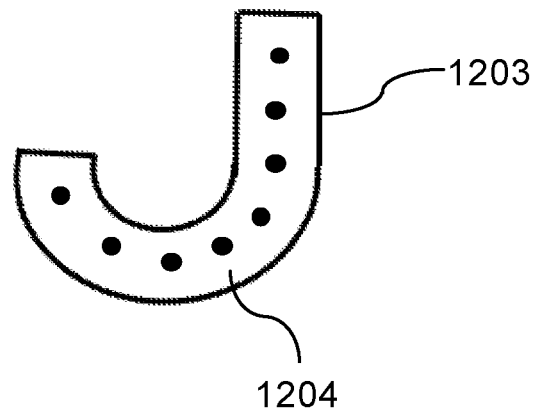
Figure 12C:
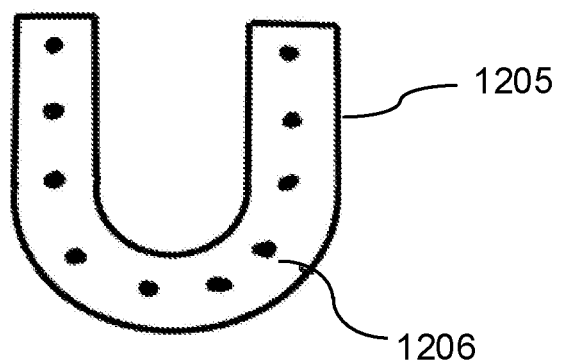

The invention claimed is:

1. An elastic and oblong seal for sealing one or more gaps wherein the one or more gaps are selected from the group consisting of: one or more gaps between a building part and an adjacent surface, one or more gaps between a wall and an adjacent surface, and one or more gaps between a fence and an adjacent surface, said seal comprising:
  a sealing section comprising an elastic outer material in the form of a polymer; and
  a rodent proofing barrier embedded in at least a part of the elastic outer material, said barrier comprising a plurality of separate metal wires arranged at a distance to each other and extending substantially in parallel to a longitudinal direction of the seal.

2. The seal of claim 1, wherein the elastic outer material is a thermoplastic elastomer or rubber.

3. The seal of claim 2, wherein:
  the plurality of separate metal wires comprises at least two separate metal wires that each are solid single stranded wires with a surface that is coated with an adhesive coating to which the elastic outer material adheres better than to the at least two separate metal wires; and
  the elastic outer material constitutes one single outer material, in which the at least two separate metal wires are embedded.

4. The seal of claim 3, wherein the distance between the at least two separate metal wires is no larger than 10 mm; and
  the elastic outer material is the thermoplastic elastomer.

5. The seal of claim 2, wherein the a Shore A hardness of the thermoplastic elastomer or rubber is between 45 and 90.

6. The seal of claim 4, wherein the one or more gaps are the one or more gaps between the building part and the adjacent surface; and
  wherein the distance between the at least two separate metal wires is no larger than 8 mm.

7. The seal of claim 6, wherein the building part is a door leaf.

8. The seal of claim 7, wherein the door leaf is a door leaf of an up-and-over door.

9. The seal of claim 6, wherein:
  the seal is a blade seal; and
  the at least two separate metal wires are made of steel.

10. The seal of claim 9, wherein:
  a cross section of the seal is symmetric with a uniform structure;
  the at least two separate wires are at least six separate metal wires; and
  said at least six separate metal wires are distributed evenly over a width of the seal.

11. The seal of claim 6, wherein the seal has a substantially U-shaped cross-sectional form.

12. The seal of claim 6, wherein the seal has a substantially L-shaped cross-sectional form.

13. The seal of claim 6, wherein the seal has a substantially J-shaped cross-sectional form.

14. The seal of claim 1, wherein:
  the one or more gaps are the one or more gaps between the building part and the adjacent surface;

the rodent proofing barrier consists essentially of the plurality of separate metal wires;

the plurality of separate metal wires comprises at least two separate wires with a diameter of at least 0.4 mm; and the distance between the at least two separate metal wires is no larger than 10 mm.

15. The seal of claim 14, wherein the building part is a door leaf and the seal is a blade seal.

16. A method of securing the one or more gaps between the building part and the adjacent surface against pests comprising the step of mounting the seal according to claim 6 on the building part.

17. The method of claim 16, wherein the building part is a door leaf.

18. The method of claim 17, wherein the door leaf is a door leaf of an up-and-over door.

19. The method of claim 16, wherein the step of mounting the seal comprises securing the seal to the door by means of a 20-80 mm wide mounting strip.

20. The method of claim 19, wherein the mounting strip is made of a polymer.

\* \* \* \* \*